United States Patent
Arya et al.

(10) Patent No.: US 12,026,467 B2
(45) Date of Patent: Jul. 2, 2024

(54) AUTOMATED LEARNING BASED EXECUTABLE CHATBOT

(71) Applicant: ACCENTURE GLOBAL SOLUTIONS LIMITED, Dublin (IE)

(72) Inventors: Rinki Arya, Bangalore (IN); Tanuj Chawla, Mumbai (IN); Shruti Chhabra, Ghaziabad (IN); Sonam Gupta, Bangalore (IN); Kiran Cskumar, Bangalore (IN); Krishna Kummamuru, Bangalore (IN); Vinay Narayana, Bangalore (IN); Thomas Mammen Tharakan, Bangalore (IN); Anurag Tripathi, Gurugram (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 457 days.

(21) Appl. No.: 17/394,333

(22) Filed: Aug. 4, 2021

(65) Prior Publication Data
US 2023/0037894 A1 Feb. 9, 2023

(51) Int. Cl.
*G06F 40/289* (2020.01)
*G06F 16/93* (2019.01)
(Continued)

(52) U.S. Cl.
CPC ............ *G06F 40/289* (2020.01); *G06F 16/93* (2019.01); *G06F 40/40* (2020.01); *G06N 20/00* (2019.01); *H04L 51/02* (2013.01)

(58) Field of Classification Search
CPC ........ G06F 40/289; G06F 16/93; G06F 40/40; G06N 20/00; H04L 51/02
See application file for complete search history.

(56) References Cited

U.S. PATENT DOCUMENTS

| | | | |
|---|---|---|---|
| 11,429,834 B1* | 8/2022 | Xue | G06F 40/284 |
| 2014/0006012 A1* | 1/2014 | Zhou | G06F 16/3344 |
| | | | 704/9 |

(Continued)

OTHER PUBLICATIONS

Yilmaz, Kloos: KL Divergence-based Out-of-Scope Intent Detection in Human-to-Machine Conversations, 2020, SIGIR '20, Jul. 25-30, 2020, Virtual Event, China, whole document (Year: 2020).*

(Continued)

*Primary Examiner* — Sonia L Gay
(74) *Attorney, Agent, or Firm* — Mannava & Kang, P.C.

(57) ABSTRACT

A system and method for upgrading an executable chatbot is disclosed. The system may include a processor including a fallout utterance analyzer, a response identifier, a deviation identifier, a flow generator and enhancer. The fallout utterance analyzer may receive chats logs comprising a plurality of utterances and corresponding bot responses. The fallout utterance analyzer may classify the plurality of utterances into multiple buckets pertaining to at least one of an out-of-scope intent, a newly identified intent, and a new variation of an existing intent. The response identifier may generate auto-generated responses corresponding to new intents for upgrading the executable chatbot. The deviation identifier may overlay corresponding intent in the chat logs with the prestored flow dialog network to designate an extent of deviation with respect to flow prediction performance by the executable chatbot. The flow generator and enhancer may generate an auto-generated conversational dialog flow for upgrading the executable chatbot.

17 Claims, 18 Drawing Sheets

(51) Int. Cl.
*G06F 40/40* (2020.01)
*G06N 20/00* (2019.01)
*H04L 51/02* (2022.01)

(56) References Cited

U.S. PATENT DOCUMENTS

| | | | |
|---|---|---|---|
| 2017/0039271 A1* | 2/2017 | Bishop | G06F 40/211 |
| 2019/0347326 A1* | 11/2019 | Kozhaya | G06F 40/30 |
| 2020/0151253 A1* | 5/2020 | Wohlwend | G06N 3/044 |
| 2020/0236068 A1* | 7/2020 | TeNyenhuis | G06F 40/35 |
| 2020/0387673 A1* | 12/2020 | Beaver | G06F 18/2178 |
| 2021/0357441 A1* | 11/2021 | Zhuo | G06F 16/3322 |
| 2022/0208178 A1* | 6/2022 | Sundaram | G10L 15/10 |

OTHER PUBLICATIONS

Wikipedia, "Kurtosis", downloaded on the Internet on Sep. 9, 2021, 13 pages. <https://en.wikipedia.org/wiki/Kurtosis>.
Wikipedia, "Skewness", downloaded on the Internet on Sep. 9, 2021, 12 pages. <https://en.wikipedia.org/wiki/Skewness>.
Wikipedia, "Entropy (information theory)", downloaded on the Internet on Sep. 9, 2021, 1 page.
Trelib, "Welcome to treelib's documentation!", downloaded on the Internet on Sep. 9, 2021, 1 page. <https://treelib.readthedocs.io/en/latest/>.
NetworkX, "Software for complex networks", downloaded from the Internet on Sep. 9, 2021, 1 page. <https://networkx.org/>.
NetworkX, "networkx.algorithms.dag.topological_sort—NetworkX 2.6.2 documentation", downloaded on the Internet on Sep. 9, 2021, 3 pages. <https://networkx.org/documentation/stable/reference/algorithms/generated/networkx.algorithms.dag.topological_sort.html>.

* cited by examiner

| | | | | | |
|---|---|---|---|---|---|
| UNKNOWN | CHECK FOR SELF ISOLATION | CHECK_SELF_ISOLAT ∧ | 5 | E2A55DEE-0449-42C2-ACB1-EC8EA7E29E96 | NOT KNOWN | ☐ |
| UNKNOWN | EXPOSED PLACES SELECTED | FEVER_NO ∧ | 5 | E4851EC2-0C8C-4245-AA81-87A535C4C8B0 | NOT KNOWN | ☐ |
| UNKNOWN | NO MORE | CHECK_SELF_ISOLAT ∧ | 5 | 897DA949-AF35-412C-899F-A61286B9561B | NOT KNOWN | ☐ |
| UNKNOWN | EXPOSED PLACES SELECTED | EXPOSED_PLACES_ ∧ | 5 | EADEFC57-9D7A-49A1-8CD7-F30A4D1EDBCA | NOT KNOWN | ☐ |
| UNKNOWN | NO MORE ANSWERS | FEVER_NO ∧ | 5 | 0167A685-0542-49FD-BBC7-1A25422C43CFE | NOT KNOWN | ☐ |
| UNKNOWN | EXPOSED PLACES SELECTED | EXPOSED_PLACES_ ∧ | 5 | 527F74379-19C7-4421-90CC-6245E143FC54 | NOT KNOWN | ☐ |
| UNKNOWN | IF IN TESTED POSITIVE FOR COVID AND I GOT IT AT WORK AND NOT WORKING DO THEY HAVE TO PAY ME | ELIGIBLE_FOR_WORL ∧ | 5 | F1D05768-05D7-477E-98AF-8FC931E1843D | NOT KNOWN | ☐ |
| UNKNOWN | IF I TEST POSITIVE FOR COVID I WAS INFECTED AT WORK DO I GET WORKERS COMPENSATION | ELIGIBLE_FOR_WORL ∧ | 5 | F1D05768-05D7-477E-98AF-8FC931E1843D | INCOMPREHENSION | ☐ |
| UNKNOWN | QUARANTINE | QUARANTINE ∧ | 5 | EF9F76E9-25C5-4DD0-B105-E7E8E5C4DF69 | NOT KNOWN | ☐ |

| Fallout Utterance 402 | Scope Type 404 | Predicted Intent 406 | Notes 408 |
|---|---|---|---|
| Where can I get pizza? | Out-of-Scope | NA | One-class SVM can distinguish out-of-scope and in-scope utterances |
| Do we have legal services? | New Intent | legal_services | The utterance doesn't match any of the existing intents and can be further processed to recommend an intent via clustering |
| Does ESPP apply to me even though I have joined the company recently | New Variation | purchas_stock_program | Rephrase of an utterances marked under an existing intent |

| Fallout 602 | Closest Training Paraphrase 604 | Default 606 | Recommended Training Intent 608 | Main Question 610 |
|---|---|---|---|---|
| WHERE DO I FIND JOB OPENINGS AS A CURRENT EMPLOYEE | WHERE DO I FIND JOB OPENINGS FOR CURRENT EMPLOYEES? | DEFAULT FALLBACK INTENT | open_posit_experti s | HOW DO I VIEW OPEN POSITIONS FOR UPS IN MY LOCATION AND WHICH ARE IN MY AREA OF EXPERTISE? |
| CHANGE MY PROFILE | CHANGE PROFILE PHOTOS | DEFAULT FALLBACK INTENT | updat_person_telep hon | HOW DO I CHANGE MY PERSONAL INFORMATION LIKE ADDRESS, TELEPHONE, DEPENDENTS, EMERGENCY CONTACT, ETC.? |
| HOW CAN I CHECK MY PAY CHECKS | HOW DO I VIEW MY PAY CHECK | DEFAULT FALLBACK INTENT | see_link_statement | WHERE DO I SEE MY PAY STATEMENTS? |
| WHERE'S MY MONEY | WHERE IS MY MONEY (PAYCHECK) | DEFAULT FALLBACK INTENT | manag_team_chan g | I DIDN'T GET MY PAYCHECK; WHO DO I TALK TO? |
| UNUSED VACATION TIME | WHAT IS MY UNUSED VACATION | ASK_LIVE_AG ENT | discretionari_vacat_ time | HOW DO I FIND OUT HOW MUCH VACATION AND DISCRETIONARY DAYS I HAVE? |

FIG. 6

| FALLOUT 702 | DEFAULT 704 | MAIN QUESTION 706 |
|---|---|---|
| WHERE DO I APPLY FOR THE EMERGENCY PAID LEAVE (EPL) COVID PAY? | ask_live_agent | WHEN CAN I REQUEST AN UNPAID LEAVE? |
| HOW DO I MOVE AN EMPLOYEE IN MY HEIRARCHY TO A NEW MANAGER? | default fallback intent | WHERE CAN I RECORD PERFORMANCE FEEDBACK OF MY TEAM MEMBER? |
| UPDATE PHOTO WORKDAY | default fallback intent | WHAT HAPPENED TO THE PROFESSIONAL CONDUCT AND ANTI-HARASSMENT POLICY? |
| REVERSE TERMINATION | default fallback intent | WHY HAS MY ESPP DEDUCTION STOPPED? |
| WHERE IS GEMS LOCATED? | ask_live_agent | WHERE CAN I LEARN MORE ABOUT GOAL SETTING, PERFORMANCE AND DEVELOPMENT AT UPS? |

*FIG. 7*

| SR.NO | PARAMETER 902 | DESCRIPTION 904 |
|---|---|---|
| 1. | USER ACQUISITION/RETENTION | NUMBER & DISTRIBUTION OF UNIQUE, NEW AND RETURNING USERS OBSERVED WITHIN FILTER CRITERIA |
| 2. | SESSIONS & JOURNEYS | NUMBER & DISTRIBUTION OF SESSIONS & TYPES OF JOURNEYS OBSERVED WITHIN FILTER CRITERIA |
| 3. | MOST FREQUENT JOURNEYS | MOST FREQUENT JOURNEYS OBSERVED WITHIN THE FILTER CRITERIA |
| 4. | OVERALL FEEDBACK & CSAT LEVEL | NUMBER OF INDIVIDUAL FEEDBACKS OBSERVED & WEIGHTED AVERAGE OF ALL FEEDBACKS RECEIVED |
| 5. | INCOMPREHENSION | NUMBER & DISTRIBUTION OF SESSIONS WHERE CHATBOT COULD NOT UNDERSTAND THE USER UTTERANCE |
| 6. | ESCALATION | NUMBER & DISTRIBUTION OF SESSIONS WHERE EITHER CHATBOT HANDED OVER TO A LIVE AGENT OR USER EXPLICITLY ASKED TO BE HANDED OVER TO A LIVE AGENT |
| 7. | ABANDONMENT | NUMBER AND DISTRIBUTION OF SESSIONS WHERE THE CONVERSATION DID NOT REACH EXPECTED END OF FLOW |
| 8. | CONTAINMENT RATE | NUMBER & DISTRIBUTION OF CONTAINMENTS ∃ INTERACTIONS WHICH DID NOT RESULT IN FAILURES - INCOMPREHENSION, ESCALATION OR ABANDONMENT |
| 9. | FREQUENT CONVERSATION PATHS | MOST FREQUENT INTENT SEQUENCES FOLLOWED BY USERS ∃ OVERALL & AMONG FAILURES |
| 10. | TIME RANGE COMPARISON | COMPARISON & CALCULATION OF IMPROVEMENT OR DECLINE W.R.T TO EQUIVALENT PRECEDING DURATION |
| 11. | LOOPS | NUMBER OF SESSIONS THAT FOLLOW THE SAME FLOW PATH MULTIPLE TIMES IN A SINGLE SESSION |
| 12. | EXCEPTIONS | NUMBER OF SESSIONS WHERE AN UNEXPECTED BOT RESPONSE (PROGRAM ERROR, METADATA MISMATCH) WAS OBSERVED |
| 13. | ADVISOR ESCALATIONS | NUMBER & DISTRIBUTION OF ESCALATION HANDLING ∃ SUCCESSFUL RESOLUTIONS, AGENT BUSY & OUT OF OFFICE CASES |

FIG. 9

| PASSAGE |  |
|---|---|
| IN THE EVENT OF DEATH OF A CLOSE FAMILY MEMBER, YOU ARE ENTITLED TO PAID TIME OFF FROM WORK UP TO THREE WORKING DAYS FOR EACH SUCH SITUATION. CLOSE FAMILY MEMBERS WOULD INCLUDE SPOUSE, CHILDREN, PARENTS, GRANDPARENTS, BROTHER, SISTER AND CORRESPONDING IN-LAWS. AT THE TIME OF AVAILING BEREAVEMENT LEAVE, YOU MUST INTIMATE YOUR IMMEDIATE SUPERVISOR AND PEOPLE ADVISOR BEFORE THE NEXT WORKING DAY AND THE LEAVES AVAILED MUST BE CHARGED AGAINST "BEREAVEMENT LEAVE" IN THE TIME AND EXPENSE REPORTING APPLICATION | |
| UTTERANCE 1204 | RESPONSE 1206 |
| MY SISTER DIED. AM I ELIGIBLE FOR PAID TIME OFF | YOU ARE ENTITLED TO PAID TIME OFF FROM WORK UP TO THREE WORKING DAYS FOR EACH SUCH SITUATION' |
| MY SISTER DIED. I TOOK LEAVE. HOW SHOULD I CHARGE IT? | BEREAVEMENT LEAVE |
| MY SISTER DIED. I TOOK LEAVE. WHERE SHOULD I CHARGE IT? | TIME AND EXPENSE REPORTING APPLICATION |

FIG. 12

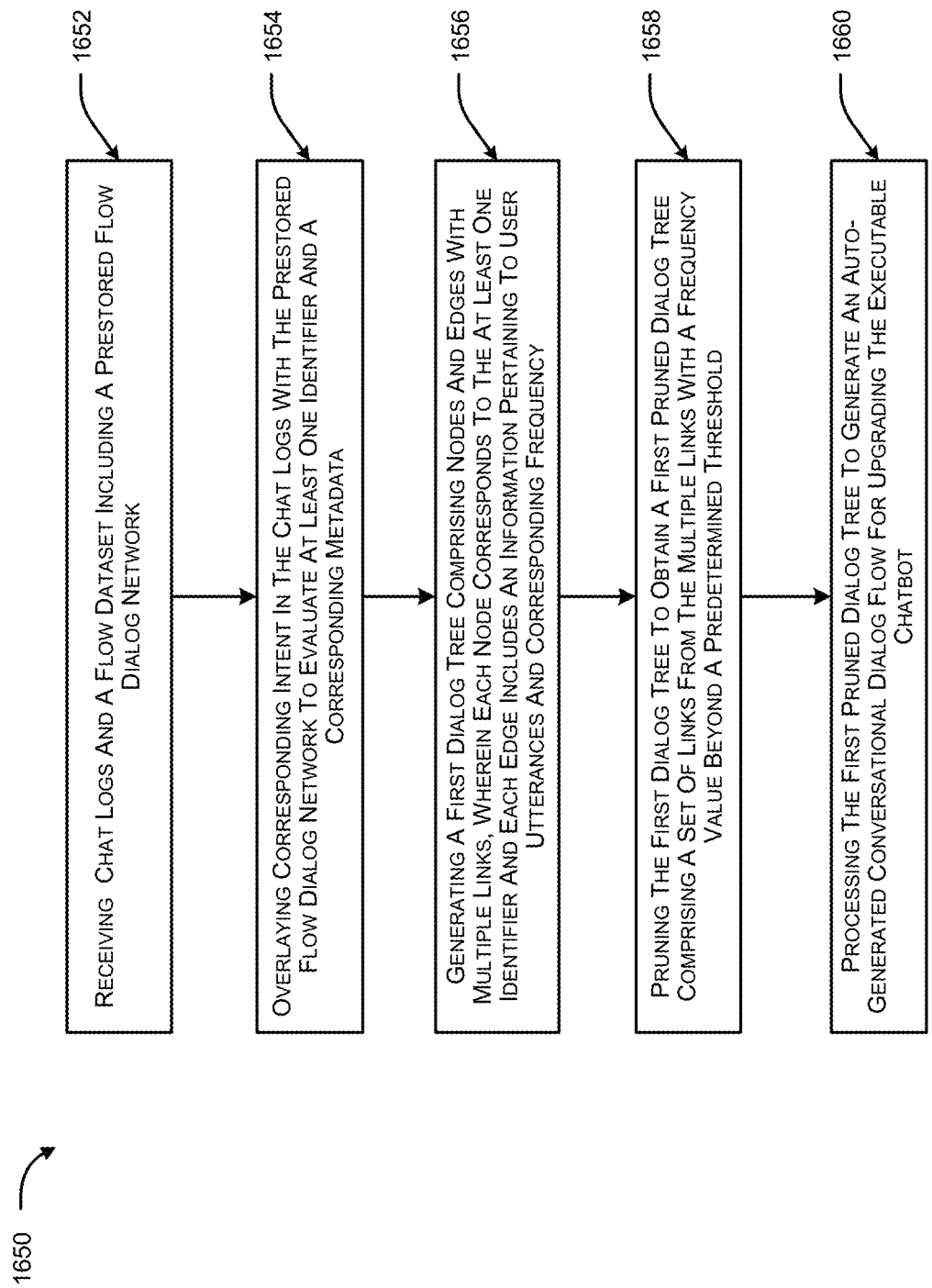

AUTOMATED LEARNING BASED EXECUTABLE CHATBOT

BACKGROUND

An executable chatbot is an online virtual assistant that can converse with a user or provide suitable responses to a user query. Such a conversation may include, for example, a chat conversation via text or text-to-speech, for providing assistance in the absence of a live human agent. Chatbots may also be used for guiding a user with the required information or providing suitable alternatives. Chatbots may also be used as a tool for several other purposes including, for example, an enquiry service, a customer service, marketing, educational purposes, providing product based information, routing a request to the appropriate party, and other such activities. The field of application of chatbots may include usage categories such as, for example, commerce (e-commerce via chat), education, entertainment, finance, health, news, productivity, and other such categories. Predominantly, chatbots may be accessed on-line via website popups or in the form of virtual assistants to provide responses to the user query in real-time.

However, existing chatbots may suffer from several drawbacks. This may be because of certain limitations of chatbots, such as, for example, limited comprehension of user query, presenting the same response repeatedly (termed as loops) and providing irrelevant responses. Several other such limitations may be present in the chatbots that may lead to an unsatisfactory user experience, low efficiency of bot performance, and subsequent increased manual intervention. These limitations may nullify the advantages of the chatbots and limit their usage.

SUMMARY

An embodiment of present disclosure includes a system including a processor. The processor may include a fallout utterance analyzer, a response identifier, a deviation identifier, a flow generator and enhancer. The system may also include a self-learning engine. The fallout utterance analyzer may receive chat logs from a database of the system. The chat logs may include a plurality of utterances pertaining to a user and corresponding bot responses by the executable chatbot. The chat logs may be in the form of a dialog between the user and the executable chatbot. The fallout utterance analyzer may evaluate the plurality of utterances to classify into multiple buckets. The fallout utterance analyzer may evaluate by comparison with a document corpus from the database. The classification may be performed based on the nature of corresponding intent of each utterance. The multiple buckets may pertain to at least one of an out-of-scope intent, a newly identified intent, and a new variation of an existing intent. The response identifier may receive new intent based utterances from the fallout utterance analyzer. The new intent based utterances may correspond to the bucket related to the newly identified intent. The response identifier may index the document corpus based on the new intent based utterances to obtain a plurality of queries. Each query from the plurality of queries may be evaluated to perform a query understanding and query ranking. Each query may be evaluated to obtain endorsed queries. The endorsed queries may be used to generate auto-generated responses corresponding to the new intents for upgrading the executable chatbot. The deviation identifier may receive chat logs and a flow dataset from the database. The flow dataset may include a pre stored flow dialog network. The deviation identifier may overlay the corresponding intent in the chat logs with the prestored flow dialog network to evaluate at least one identifier and a corresponding metadata. The identifier may pertain to an identity associated with the intent and the metadata may include information related to the identity. The overlay may designate an extent of deviation with respect to flow prediction performance by the executable chatbot. The flow generator and enhancer may receive the chat logs from the database. The flow generator and enhancer may generate a first dialog tree, based on the chat logs and using a prestored library in the database. The first dialog tree may include nodes and edges with multiple links, wherein the node may correspond to the identifier and the edge may include information pertaining to the plurality of utterances (of user) and their corresponding frequency. The flow generator and enhancer may prune the first dialog tree to obtain a first pruned dialog tree. The first pruned dialog tree may include a set of links from the multiple links with a frequency value beyond a predetermined threshold. The first pruned dialog tree may process the first pruned dialog tree to generate an auto-generated conversational dialog flow for upgrading the executable chatbot. The self-learning engine may update at least one of the auto-generated responses corresponding to the newly identified intents and the auto-generated conversational dialog flow. The self-learning engine may update the auto-generated responses and/or flow for enhancing the accuracy beyond predefined threshold.

Another embodiment of the present disclosure may include a method for automated learning based upgrade of an executable chatbot, based on intent and/or flow. The method includes a step of receiving, by a processor, chat logs that may include a plurality of utterances pertaining to a user and corresponding bot responses by an executable bot. The chat logs may be in the form of a dialog between the user and the executable chatbot. The method includes a step of evaluating, by a processor, the plurality of utterances to classify into multiple buckets based on the nature of corresponding intent of each utterance. The multiple buckets may pertain to at least one of an out-of-scope intent, a newly identified intent and a new variation of an existing intent. The method may include a step of indexing the document corpus from the database to obtain a plurality of queries. The indexing may be performed based on the new intent based utterances corresponding to the bucket related to the newly identified intent. The method may include a step of evaluating, by a processor, each query to perform a query understanding and query ranking to obtain endorsed queries. The endorsed queries may be used to generate auto-generated responses corresponding to the new intents for upgrading the executable chatbot.

The method may include a step of receiving, by the processor, chat logs and a flow dataset. The flow dataset include a prestored flow dialog network. The method may include a step of overlaying, by the processor, the corresponding intent in the chat logs with the prestored flow dialog network to evaluate at least one identifier and a corresponding metadata. The overlay may indicate an extent of deviation with respect to flow prediction performance by the executable chatbot. The method may include a step of generating, by the processor, a first dialog tree including nodes and edges with multiple links. The node may correspond to the identifier and the edge may include an information pertaining to the plurality of utterances and their corresponding frequency. The method may include a step of pruning, by the processor, the first dialog tree to obtain a first pruned dialog tree including a set of links from the multiple links with a frequency value beyond a predetermined threshold. The method may include a step of processing, by the processor, the first pruned dialog tree to generate an auto-generated conversational dialog flow for upgrading the executable chatbot.

Yet another embodiment of the present disclosure may include a non-transitory computer readable medium comprising machine executable instructions that may be executable by a processor to receive an input data corresponding to a programming language. The processor may receive chat logs that may include a plurality of utterances pertaining to a user and corresponding bot responses by an executable bot. The chat logs may be in the form of a dialog between the user and the executable chatbot. The processor may evaluate the plurality of utterances to classify into multiple buckets based on the nature of corresponding intent of each utterance. The multiple buckets may pertain to at least one of an out-of-scope intent, a newly identified intent and a new variation of an existing intent. The processor may index the document corpus from the database to obtain a plurality of queries. The indexing may be performed based on the new intent based utterances corresponding to the bucket related to the newly identified intent. The processor may evaluate each query to perform a query understanding and query ranking to obtain endorsed queries. The endorsed queries may be used to generate auto-generated responses corresponding to the new intents for upgrading the executable chatbot. In another embodiment, the processor may receive chat logs and a flow dataset. The flow dataset include a prestored flow dialog network. The processor may overlay the corresponding intent in the chat logs with the prestored flow dialog network to evaluate at least one identifier and a corresponding metadata. The overlay may indicate an extent of deviation with respect to flow prediction performance by the executable chatbot. The processor may generate a first dialog tree including nodes and edges with multiple links. The node may correspond to the identifier and the edge may include an information pertaining to the plurality of utterances and their corresponding frequency. The processor may prune the first dialog tree to obtain a first pruned dialog tree including a set of links from the multiple links with a frequency value beyond a predetermined threshold. The processor may prune the first pruned dialog tree to generate an auto-generated conversational dialog flow for upgrading the executable chatbot.

BRIEF DESCRIPTION OF DRAWINGS

FIG. 3 illustrates an example overview for analysis of the incomprehension of utterance of FIG. 2, according to an example embodiment of the present disclosure.

FIG. 4 illustrates an example overview for classification of plurality of utterances, according to an example embodiment of the present disclosure.

FIG. 6 illustrates an overview of an exemplary table to depict results derived for new variation intent based utterances by using threshold computation, according to an example embodiment of the present disclosure.

FIG. 7 illustrates an overview of an exemplary table to depict results derived for new intent based utterances by using threshold computation, according to an example embodiment of the present disclosure.

FIG. 9 illustrates an overview of performance metrics showing associated parameters and their respective description, according to an example embodiment of the present disclosure.

FIG. 12 illustrates an overview of an example passage for generating an auto-generated response by response identifier of FIG. 1, according to an example embodiment of the present disclosure.

FIGS. 16A-16B, illustrate flow diagrams for upgrading an executable chatbot, according to an example embodiment of the present disclosure.

DETAILED DESCRIPTION

Figure 1A:
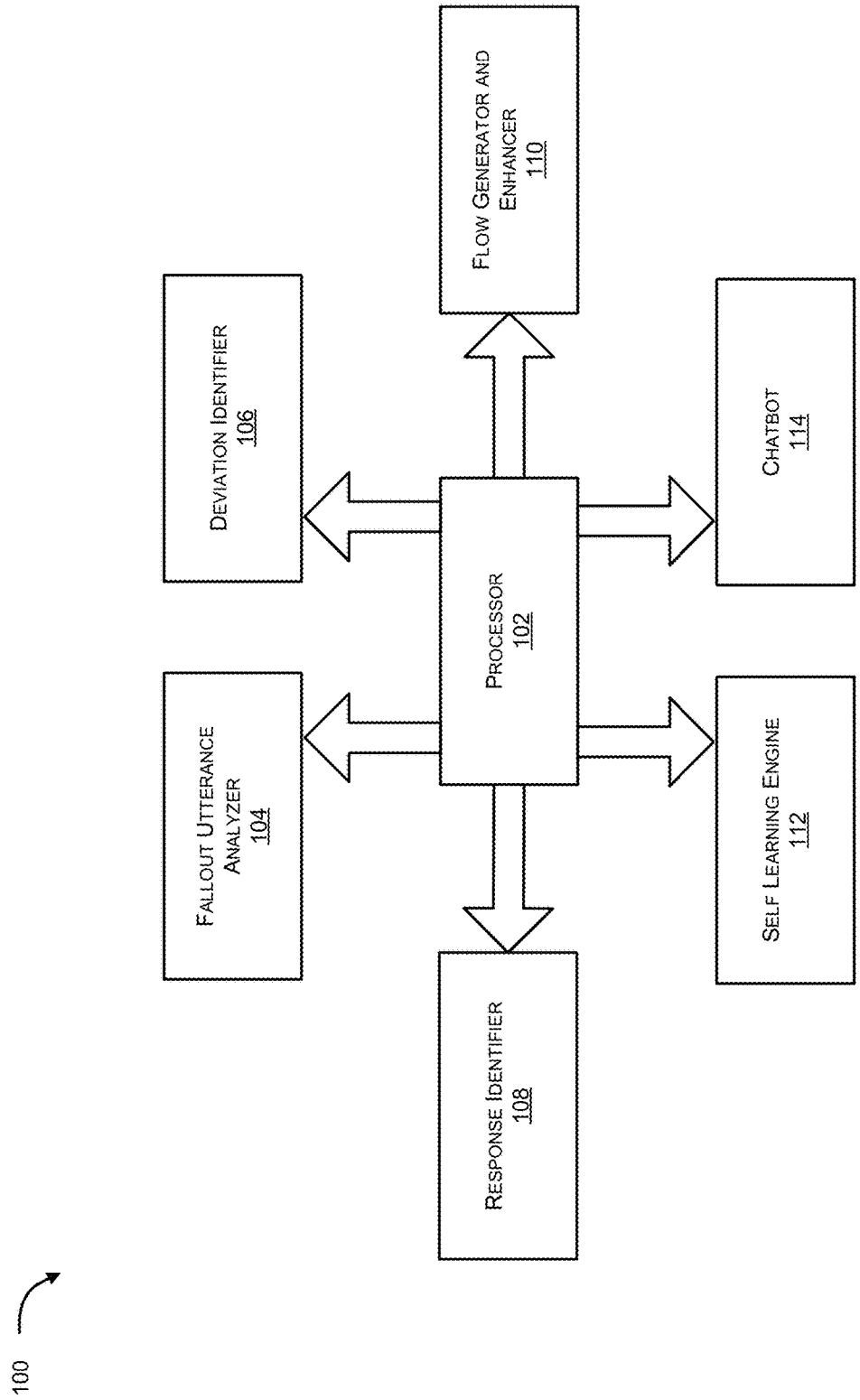
FIG. 1A illustrates a system for upgrading an executable chatbot, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Overview

Various embodiments describe providing a solution in the form of a system and a method for upgrading an executable chatbot. The executable chatbot may be upgraded by analyzing chat logs including plurality of utterances pertaining to a user and corresponding bot responses by an executable bot. The chat logs may be in the form of a dialog between the user and the executable chatbot. The solution evaluates at least one of the intent and flow of the plurality of utterances to obtain at least one of auto-generated responses corresponding to the new intents and auto-generated conversational dialog flow.

In an example embodiment, the system may include a processor for upgrading the executable bot. In an example embodiment, the processor may upgrade the executable bot with respect to intent. The processor may include a fallout utterance analyzer. The fallout utterance analyzer may receive chat logs including the plurality of utterances and the corresponding bot responses. The fallout utterance analyzer may classify the plurality of utterances into multiple buckets based on the nature of corresponding intent of each utterance. The multiple buckets may pertain to at least one of an out-of-scope intent, a newly identified intent, and a new variation of an existing intent. The processor may include a response identifier for generating auto-generated responses corresponding to the new intents for upgrading the executable chatbot. The response identifier may index document corpus based on new intent based utterances to obtain a plurality of queries. The new intent based utterances may correspond to the bucket related to the newly identified intent. Each query is evaluated to perform a query understanding and query ranking to obtain endorsed queries. The endorsed queries may be used to generate auto-generated responses corresponding to the new intents.

In an example embodiment, the processor may upgrade the executable bot with respect to flows. The processor may include a deviation identifier that may overlay corresponding intent in the chat logs with a prestored flow dialog network. The overlay may be performed to evaluate at least one identifier and a corresponding metadata. The overlay may designate an extent of deviation with respect to flow prediction performance by the executable chatbot. The processor may include a flow generator and enhancer. The flow generator and enhancer may generate a first dialog tree comprising nodes and edges with multiple links. The node may correspond to the identifier and the edge comprises information pertaining to the user utterances and their corresponding frequency. The flow generator and enhancer may prune the first dialog tree to obtain a first pruned dialog tree. The first pruned dialog tree may include a set of links from the multiple links with a frequency value beyond a predetermined threshold. The first pruned dialog tree may be processed to generate an auto-generated conversational dialog flow for upgrading the executable chatbot.

In an example embodiment, the processor may include a self-learning engine that may update at least one of the auto-generated responses and the auto-generated conversational dialog flow. The self-learning engine may enhance accuracy of at least one of the of the auto-generated responses and the auto-generated conversational dialog flow beyond the predefined first threshold and the second threshold respectively.

Exemplary embodiments of the present disclosure have been described in the framework of upgrading or improving performance of an executable chatbot used for interaction with users based on automated learning. In an example embodiment, the system and method of the present disclosure may be used to upgrade executable chatbot that may be in the form of a virtual assistant used for guiding a user or resolving a query of user in absence of manual assistance. However, one of ordinary skill in the art will appreciate that the present disclosure may not be limited to such applications. The upgrading may reduce manual efforts otherwise needed in analyzing/deducing insights from chat logs between user and the executable chatbot. The automated learning based upgrade of chatbot may also increase containment or usage of executable chatbot while reducing risk in humans handling sensitive chatlog information and enhancing user experience.

FIG. 1A illustrates a system 100 for upgrading an executable chatbot 114, according to an example embodiment of the present disclosure. The system 100 may be implemented by way of a single device or a combination of multiple devices that are operatively connected or networked together. The system 100 may be implemented in hardware or a suitable combination of hardware and software. The system 100 includes a processor 102. The processor may include fallout utterance analyzer 104, a response identifier 108, a deviation identifier 106, a flow generator and enhancer 110. The system may also include a self-learning engine 112.

The system 100 may be a hardware device including the processor 102 executing machine readable program instructions to perform upgrading of the executable chatbot. Execution of the machine readable program instructions by the processor 102 may enable the proposed system to upgrade the executable chatbot. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, feature extraction, and/or any other functions. Any reference to a task in the present disclosure may refer to an operation being or that may be performed on data.

The fallout utterance analyzer 104 may receive chat logs from a database of the system. The chat logs may include a plurality of utterances pertaining to a user and corresponding bot responses by the executable chatbot 114. The chat logs may be in the form of a dialog between the user and the executable chatbot 114. The fallout utterance analyzer 104 may evaluate nature of intent of the plurality of utterances. Based on the evaluation, the response identifier 108 may generate auto-generated responses. The fallout utterance analyzer 104 may evaluate the plurality of utterances to classify into multiple buckets. The fallout utterance analyzer 104 may evaluate by comparison with a document corpus from the database. The classification may be performed based on the nature of corresponding intent of each utterance. The multiple buckets may pertain to at least one of an out-of-scope intent, a newly identified intent, and a new variation of an existing intent. The term "intent" may pertain to an intention of a user related to the conversation or dialog in the chat logs, wherein the intent may help to understand the context and domain corresponding to the utterances by the user. The term "out of scope intent" may pertain to utterances that are not related to a predefined domain. The term "new variation of an existing intent" may pertain to utterances that are already defined but may not be identified by the executable chatbot due to low confidence. The term "newly identified intent" may pertain to utterances that may fall within predefined domain of interaction but may not be already defined by the system. The response identifier 108 may receive new intent based utterances from the fallout utterance analyzer 104. The new intent based utterances may correspond to the bucket related to the newly identified intent. The response identifier 108 may index the document corpus based on the new intent based utterances to obtain a plurality of queries. Each query from the plurality of queries may be evaluated to perform a query understanding and query ranking. Each query may be evaluated, using the document corpus from database, to obtain endorsed queries. The endorsed queries may be used to generate auto-generated responses corresponding to the new intents for upgrading the executable chatbot.

The deviation identifier 106 may receive the chat logs and a flow dataset from the database. The flow dataset may include a pre stored flow dialog network. The deviation identifier 106 may overlay the corresponding intent in the chat logs with the prestored flow dialog network to evaluate at least one identifier and a corresponding metadata. The identifier may pertain to an identity associated with the intent and the metadata may include information related to the identity. In an example embodiment, the overlay may designate an extent of deviation with respect to flow prediction performance by the executable chatbot.

The flow generator and enhancer 110 may receive the chat logs 158 from the database. The flow generator and enhancer 110 may generate a first dialog tree, based on the chat logs and using a prestored library in the database. The first dialog tree may include nodes and edges with multiple links, wherein the node may correspond to the identifier and the edge may include information pertaining to the user utterances and their corresponding frequency. The flow generator and enhancer 110 may prune the first dialog tree to obtain a first pruned dialog tree. The first pruned dialog tree may include a set of links from the multiple links with a frequency value beyond a predetermined threshold. The first pruned dialog tree may process the first pruned dialog tree to generate an auto-generated conversational dialog flow for upgrading the executable chatbot.

In an example embodiment, the self-learning engine 112 may update at least one of the auto-generated responses corresponding to the newly identified intents and the auto-generated conversational dialog flow. The self-learning engine 112 may update the auto-generated responses and/or flow for enhancing the accuracy beyond predefined threshold.

Figure 1B:
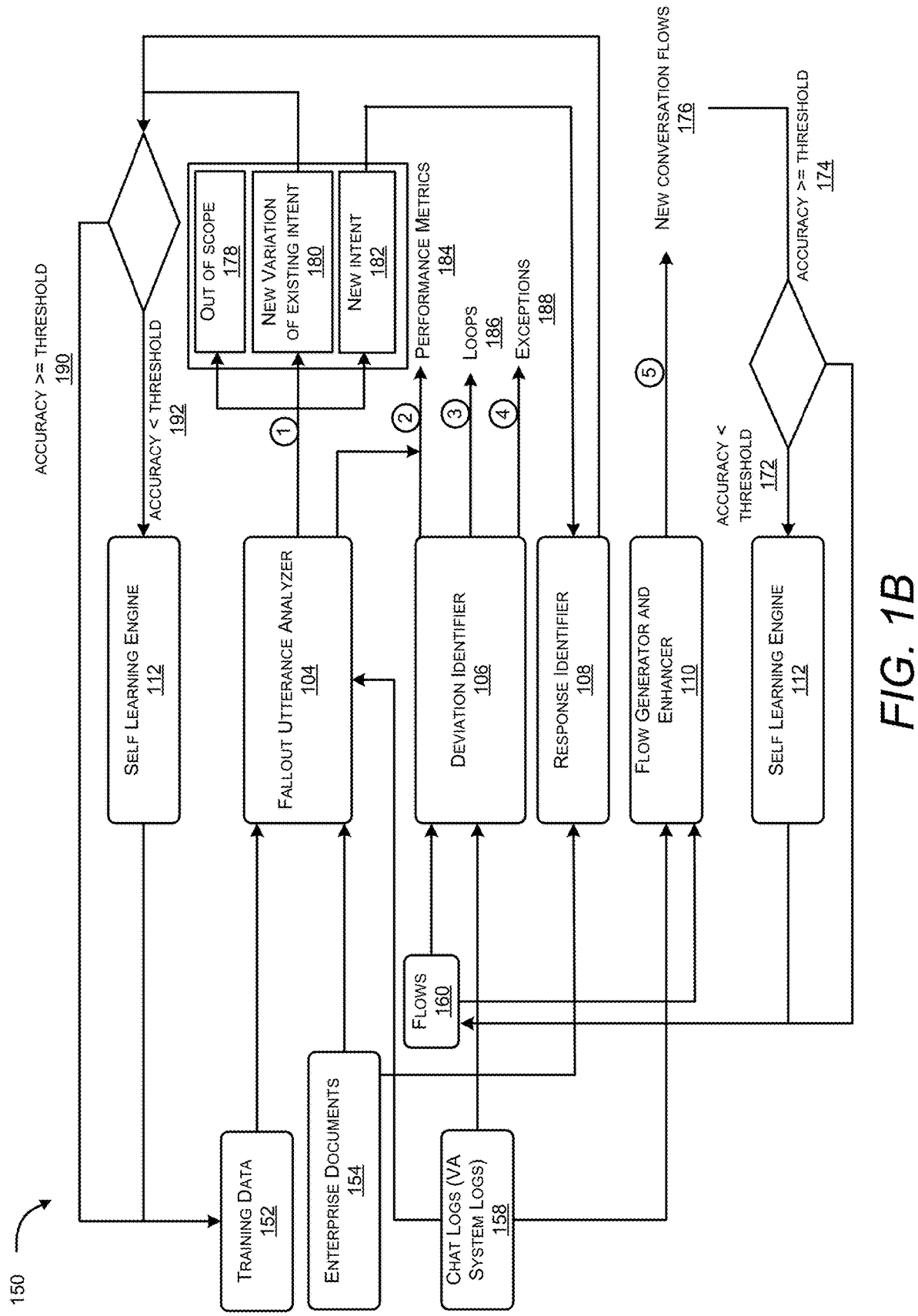
FIG. 1B illustrates a flow diagram depicting components of the system of FIG. 1, according to an example embodiment of the present disclosure.

FIG. 1B illustrates a flow diagram (150) depicting components of the system of FIG. 1 and an overview of the steps involved in upgrading an executable chatbot, according to an example embodiment of the present disclosure. As illustrated in FIG. 1B and as explained in the description of FIG. 1A, the system may include a database having prestored or accumulated information including a training data 152, enterprise documents 154 and chat logs 158 (or Virtual Assistant system logs/VA system logs). The training data may include information that may be used during the creation of the chatbot 114. The enterprise documents 154 may include a set of domain based information that may be used for generating auto-generated responses and flows. The chat logs 158 may include recorded dialog conversation between a user and executable chatbot that is to be upgraded. As shown, the training data 152 and the enterprise documents 154 along with the chat logs are sent to the fallout utterance analyzer 104. The fallout utterance analyzer 104 may evaluate the chat logs 158 by comparison with the training data 152 and the enterprise documents 154. The fallout utterance analyzer 104 may evaluate the plurality of utterances to classify into multiple buckets (indicated as 1). The classification may be performed based on the nature of corresponding intent of each utterance. The multiple buckets may pertain to at least one of an out-of-scope intent (178), a newly identified intent or a new intent (182), and a new variation of an existing intent (180).

In an example embodiment, if the intent includes a new variation of an existing intent (180) then the system may be able to identify suitable existing responses corresponding to the identified existing intent. In an example embodiment, the processor may send the new variation of an existing intent (180) to the database for updating the training data or to the self-learning engine 112 of the system, depending on the accuracy being beyond the first predefined threshold (as shown at 190, 192 as similar to auto-generated responses from the response identifier 108). In an example embodiment, the out of scope intent 178 may be rejected. The classification may enable to understand the nature of the intent so that for new intents (182), auto-generated responses may be generated by the response identifier 108. The response identifier 108 may receive the new intent based utterances corresponding to the bucket related to the newly identified intent 182. The response identifier 108 may process the new intent based utterances, using the enterprise documents 154, to generate auto-generated responses. In an example embodiment, the processor may determine an accuracy of at least one of the auto-generated responses corresponding to the newly identified intents. If the accuracy of the auto-generated responses may be equal to or exceeds a first predefined threshold (as shown at 190), the auto-generated responses may be sent to the database for updating the training data. If the accuracy of the auto-generated responses may be less than the first predefined threshold (192), the auto-generated responses may be sent to the self-learning engine 112 of the system for updating the auto-generated responses. In an example embodiment, the self-learning engine 112 and/or the various thresholds may not be limited to the mentioned parameters and several other parameters may be adjusted depending on the requirements of a user and/or on the desired characteristics of the executable chatbot. The system of the present disclosure may thus be able to firstly identify the type of intent and also to generate auto-responses for new intents.

As illustrated in FIG. 1B and as explained in the description of FIG. 1A, the deviation identifier 106 may receive the chat logs 158 and a flow dataset 160 from the database. The flow dataset 160 may include a pre stored flow dialog network that may be received from a dialog manager at the time of bot creation. The deviation identifier 106 may overlay the corresponding intent in the chat logs 158 with the prestored flow dialog network to evaluate at least one identifier and a corresponding metadata. In an example embodiment, the overlay may designate an extent of deviation with respect to flow prediction performance by the executable chatbot. Based on the evaluation, the deviation identifier 106 may be able to generate at least one of performance metrics 184, loops 186 and exceptions 188 (and other such parameters). The performance metrics 184 may indicate a frequency of occurrence of one or more common behavioral pattern of the chatbot that may give a measure of performance of the executable chatbot or an extent to which the chatbot deviates from an expected behavior. The loops 184 may indicate a number of sessions that may follow a same path several times in a single session. The exceptions 188 may relate to number of sessions wherein an unexpected bot response may be observed.

The flow generator and enhancer 110 may receive the chat logs 158. The flow generator and enhancer 110 may generate a first dialog tree, based on the chat logs and by using a prestored library in the database. The prestored library may relate to existing flow dataset 160. The flow generator and enhancer 110 may generate an auto-generated conversational dialog flow (new conversation flows 176). In an example embodiment, if the accuracy of the auto-generated conversational dialog flow 176 may be equal to or exceeds a second predefined threshold (as shown in 172), the auto-generated conversational dialog flow 176 may be sent to the database to update the flow dataset 160. If the accuracy of the auto-generated conversational dialog flow 176 is less than the second predefined threshold (as shown in 174), the auto-generated conversational dialog flow is sent to the self-learning engine 112 for updating the auto-generated conversational dialog flow. The system of the present disclosure may thus be able to understand an extent of deviation or performance of the chatbot based on analysis of flow and also be able to update the database with the new conversational flows. The self-learning engine 112 may thus be able to identify the aspects pertaining to intent and flow of dialog between user and the chatbot as well as automatically correct the inconsistencies in the behavior or performance of the chatbot. In another embodiment, the system may update the auto-generated responses and flows using manual feedback and the self-learning engine.

In an example embodiment, the fallout utterance analyzer 104 may classify the plurality of utterances into multiple buckets i.e. out-of-scope intent, a newly identified intent or a new intent, and a new variation of an existing intent, by evaluation of the nature of the intent. In an example embodiment, the fallout utterance analyzer 104 may classify the plurality of utterances as the out-of-scope intent by an anomaly detection algorithm that may identify the intent as out of scope or within scope. In an example embodiment, the classification may be performed using one-class support vector machine (SVM). The SVM is an unsupervised learning algorithm that may be trained on a predefined data falling within the scope of a desired domain (in-scope utterances) in which the chatbot is trained. The SVM may be able to learn a boundary based on these in-scope utterances of user, based on which the SVM may classify any points or utterances that lie outside the boundary as outliers (out-of-scope utterances). In an example embodiment, the SVM may be used for unsupervised outlier detection.

Figure 2:
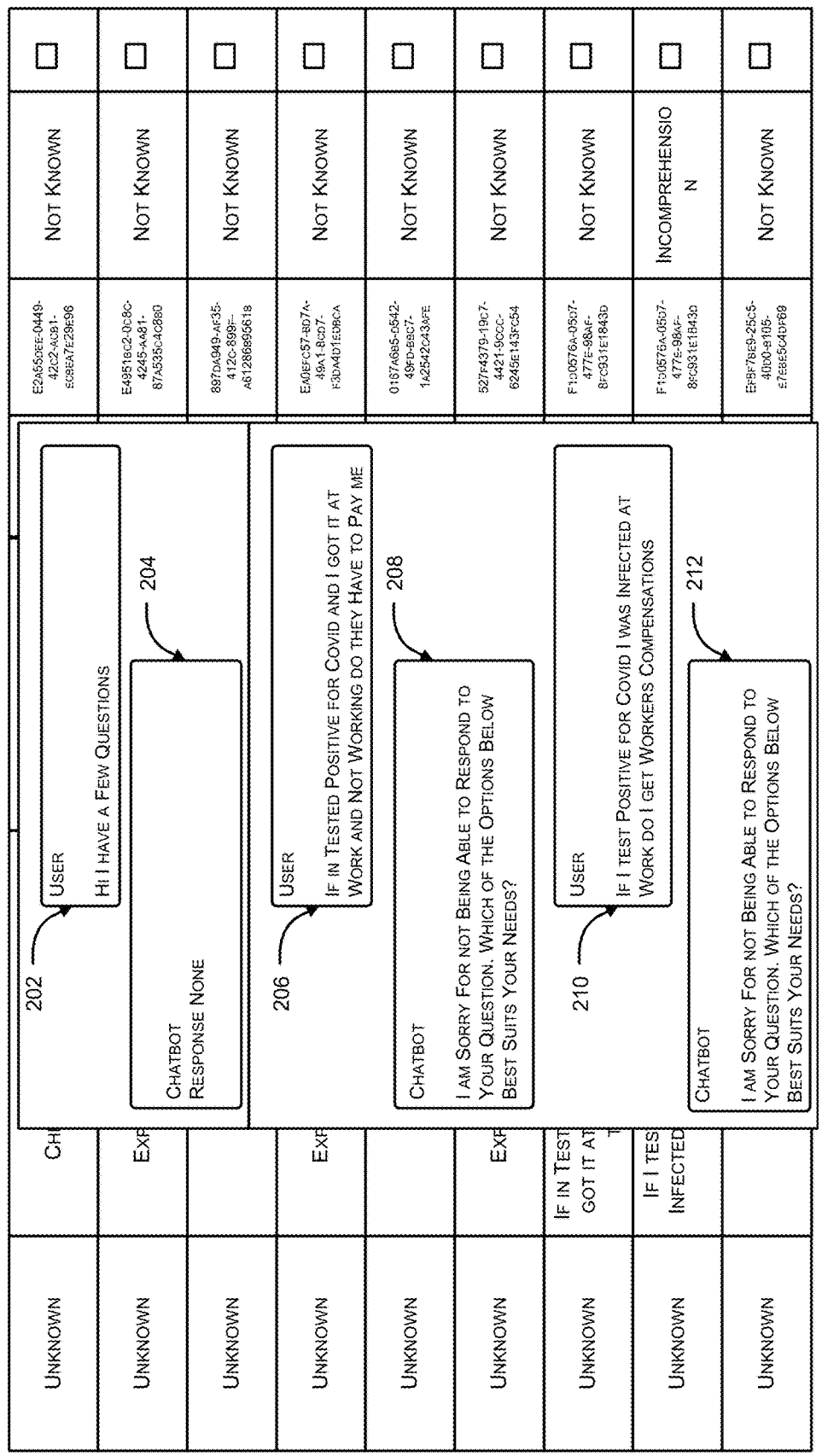
FIG. 2 illustrates an example overview showing incomprehension of the plurality of utterance by executable chatbot, according to an example embodiment of the present disclosure.

The fallout utterance analyzer may classify the plurality of utterances into the bucket pertaining to the new variation by at least one of the evaluation of incomprehension of the plurality of utterances by the executable chatbot, probability distribution of the plurality of utterances and threshold based computation of the plurality of utterances. In an example embodiment, the evaluation of incomprehension identifies that the utterances pertain to the new variation by detecting if subsequent utterances lead to a non-valid response in a single session by the executable bot and if a natural language processing (NLP) module associated with the system is able to predict the same intent. The fallout utterance analyzer 104 may detect incomprehension of the plurality of utterances (from user) by analyzing subsequent utterances of the plurality of utterances that may lead to incomprehension by chatbot in a single session. FIG. 2 illustrates an example overview 200 showing incomprehension of the plurality of utterance by executable chatbot, according to an example embodiment of the present disclosure. As shown in FIG. 2, an utterance for user at 200 indicates initiation of conversation (with no chatbot response at 204). At 206, the utterance pertains to an enquiry related to compensation, which is not comprehended by the bot as visible from the corresponding bot response at 208 (incomprehension of utterance). At 210, the utterance shows that the user asked the same question again but in a different manner using the relevant term "compensation" but the bot response at 212 indicates incomprehension of the plurality of utterances (user utterance).

In an example embodiment, the fallout utterance analyzer 104 may assess if the natural language processing (NLP) component may predict the intent pertaining to the same subsequent utterances (related to incomprehension of utterances) even though with low confidence. FIG. 3 illustrates an example overview 300 for analysis of the incomprehension of utterance of FIG. 2, according to an example embodiment of the present disclosure. As shown in FIG. 3, upon analysis of the utterance by NLP component, the intent is predicted to be "eligible for workers compensation" (as shown in the box in FIG. 3) which is an existing intent. Thus, the fallout utterance analyzer 104 may analyze if the predicted intent can be presented as one of the probable intents based on which the utterance may be classified to the bucket pertaining to the new variation of the existing intent.

FIG. 4 illustrates an example overview for classification of plurality of utterances, according to an example embodiment of the present disclosure. As shown in FIG. 4, the fallout utterance 402 indicates examples of user utterances in separate conversations or chat logs with the corresponding scope type 404 predicted by the fallout utterance analyzer and predicted intent by NLP component. As seen in the first entry (first row), the utterance is classified as out of scope intent based utterance as the fallout utterance analyzer 104 distinguished the scope as "beyond scope" using SVM as explained hereinabove. As seen in the second entry (second row), the utterance is classified as "new intent" as the utterance does not match any existing intent and may be updated in the training data. The third entry (third row) depicts how the predicted intent already exists in the database and the corresponding intent may be "new variation of existing intent". In an example embodiment, the utterance may be rephrased and updated in the database as existing intent.

In another example embodiment, the probability distribution may be performed by moment analysis including at least one of computing kurtosis, skewness, entropy and thresholding. The evaluation based on probability distribution may check if the utterances fall above a third predefined threshold and if yes, the corresponding intent may be concluded as the new variation of the existing intent. If the utterances fall below a third predefined threshold, the corresponding intent is concluded as falling under the bucket corresponding to the new intent.

In another example embodiment, the threshold based computation may be performed by computing a threshold range bearing a minimum value and a maximum value. The threshold range may be computed using document corpus in the database. In an embodiment, a distance between the minimum value and the maximum value of the threshold range may be computed using embeddings including at least one of Bidirectional Encoder Representations from Transformers (BERT) and Word Mover's Distance (WMD). In an example, the distance between the minimum value and the maximum value may be computed using WMD. WMD may be used for distance measurement between 2 documents or sentences such that it used word embeddings to calculate the similarities and to overcome synonym related problems. In an example embodiment, the fallout utterance analyzer may identify a closest training utterance for each fallout utterance of the plurality of utterances such that if the closest training utterance falls within the threshold range, the corresponding intent is concluded as the new variation. In an example embodiment, the WMD method may include calculating a score such that if the score falls between the minimum value and the maximum value of the threshold range then it may be a new variation. However, if the score may be less than minimum value or higher than maximum value, then the fallout utterance analyzer may classify the same as a new intent.

Figure 5:
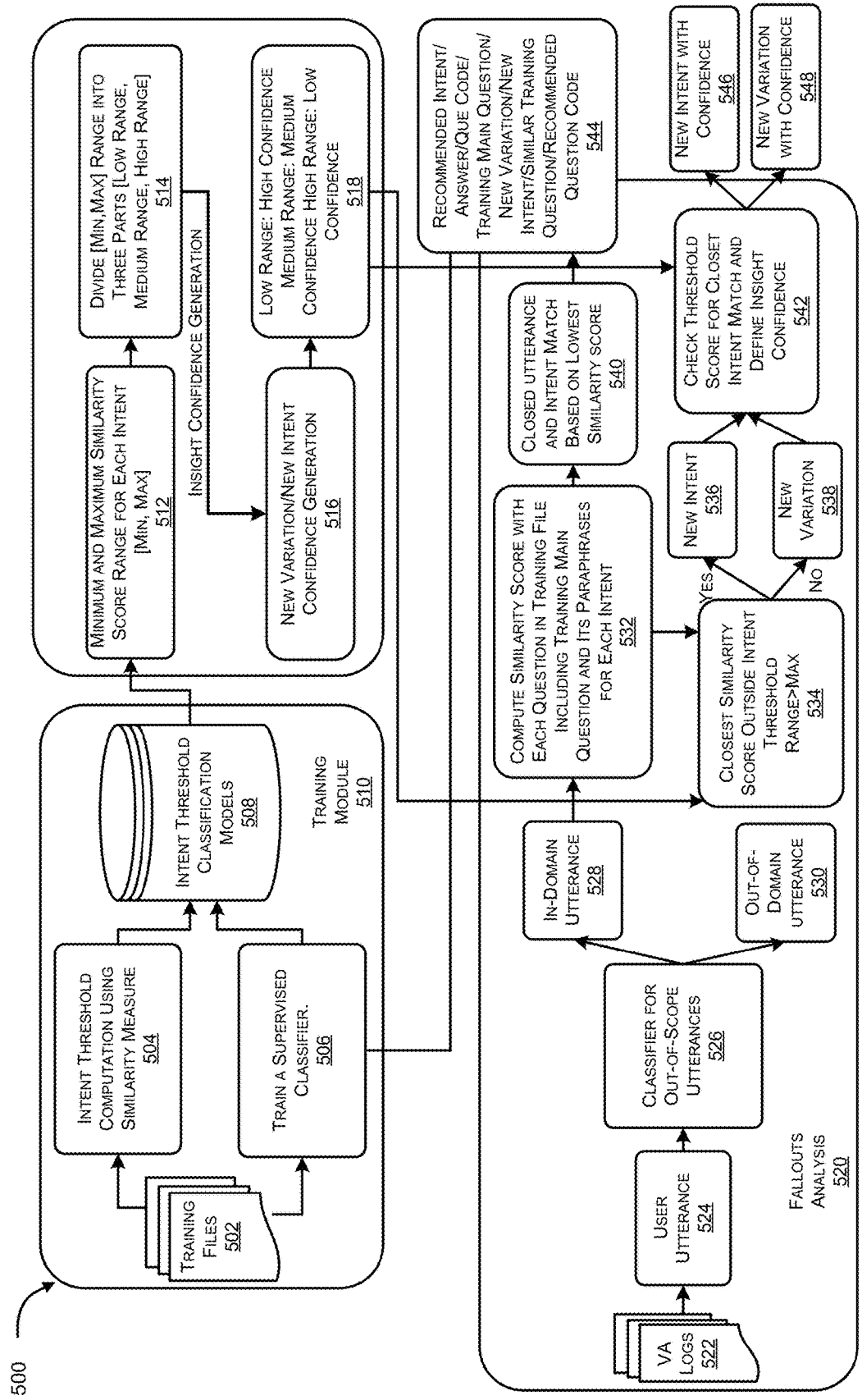
FIG. 5 illustrates a flow diagram for classification of plurality of utterances by threshold based computation, according to an example embodiment of the present disclosure.

FIG. 5 illustrates a flow diagram for classification of plurality of utterances by threshold based computation, according to an example embodiment of the present disclosure. As seen in FIG. 5, a fallout utterance analyzer 520 may be associated with a training module 510. In the training module 510, training files 502 may be used for computing intent threshold using similarity measure (504). The fallout utterance analyzer may train an intent threshold computation model 508 by receiving the intent threshold computation (504) as inputs and by using a supervised classifier (506) that may be trained using the training data. Using the intent threshold computation model 508, a minimum and maximum similarity score range may be computed for each intent (512). The threshold score range may be divided into three parts including low range, medium range and high range (514). The system may perform an insight confidence generation pertaining to new variation or new intent (516) to identify the confidence as low range, medium range and high range (518). The low range may correspond to high confidence, the medium range may correspond to medium confidence and the high range may correspond to low confidence. In an example embodiment, the threshold ranges that are determined are used by the system to identify intent pertaining to the plurality of utterances as new variation of existing intent or as new intent. The fallout utterance analysis (520) is performed by fallout utterance analyzer that receives chat logs (522) and classifies the plurality of utterances (user utterances 524) into multiple buckets based on type of intent. The classification may be done using a classifier (526) that can classify the plurality of utterances as "out of scope" intent based utterances (530) and "in-domain" intent based utterances (528). The out of scope intent based utterances are not considered further. The in-domain intent based utterances (528) may be further processed (532) to compute similarity score with each question in training file including training main question and its paraphrases for each intent. The results of the processing may result in deriving a close utterance and intent match based on lowest similarity score (540). For the result, a recommended result may be derived using the training files and trained classifier (506). The recommended result may be at least one from a recommended intent, answer or que code, training main question, new variation, new intent, similar training question and recommended question code. In an example embodiment, the recommended result may be obtained using a voting from the similarity measure and the classifier (i.e. based on 504 and 506 respectively). Based on this, if the resultant similarity score may not be within a threshold range then the type of intent may be predicted to be new intent. The processing at 532 may also lead to deriving a closest similarity score to identify (534) the utterances that may have a similarity score beyond intent threshold range i.e. similarity score falling beyond the maximum of the threshold range. The utterances with similarity score beyond the threshold range may be identified as new intent (536) and the utterances with similarity score within the threshold range may be identified as new variation (538). The fallout utterance analyzer may check threshold score (542) for closest intent match, based on the inputs from the predefined ranges as described in 544. Based on the matching, the fallout utterance analyzer may define insight confidence for the intent match to obtain two categories of output i.e. new intent with confidence (546) and new variation with confidence (548).

In an example embodiment, the fallout utterance analyzer may identify a closest training utterance for each fallout utterance of the plurality of utterances such that if the closest training utterance falls within the threshold range, the corresponding intent is concluded as the new variation. FIG. 6 illustrates an overview (600) of an exemplary table to depict results derived for new variation intent based utterances by using threshold computation, according to an example embodiment of the present disclosure. In an example embodiment, if an utterance (602) is identified as a new variation, the fallout utterance analyzer can utilize classified training data from training module to identify closest training paraphrase (604), a default intent (606), a recommended training intent (608) and a main question (610) that may correspond to the recommended training intent. For example, for an utterance (user utterance) "How can I check my pay checks", the closest training paraphrase may be "How do I view my pay check", based on which the fallout utterance analyzer may recommend an intent "see link statement" that may correspond to the main question "where do I see my pay statement". Thus the utterances from the user that may not have been identified earlier by chatbot may be possible to be identified after upgrading as the upgraded chatbot may identify the intent based on recommended intent and the main question based on which a bot response may be presented.

FIG. 7 illustrates an overview (700) of an exemplary table to depict results derived for new intent based utterances by using threshold computation, according to an example embodiment of the present disclosure. In an example embodiment, if an utterance (702) is identified as a new intent, the fallout utterance analyzer may not find a closest training paraphrase from the training module and hence may suggest a default intent (704) and a main question (706). As an example, for an utterance "where do I apply for the emergency paid leave (EPL) covid pay?", the fallout utterance analyzer may identify this intent as a new intent for which a default intent may be suggested such as "ask_live_agent". The new intent based utterances may be further sent to response identifier for generating an auto-generated response to the utterance for upgrading the executable chatbot (as explained further in FIGS. 11-12).

Figure 8:
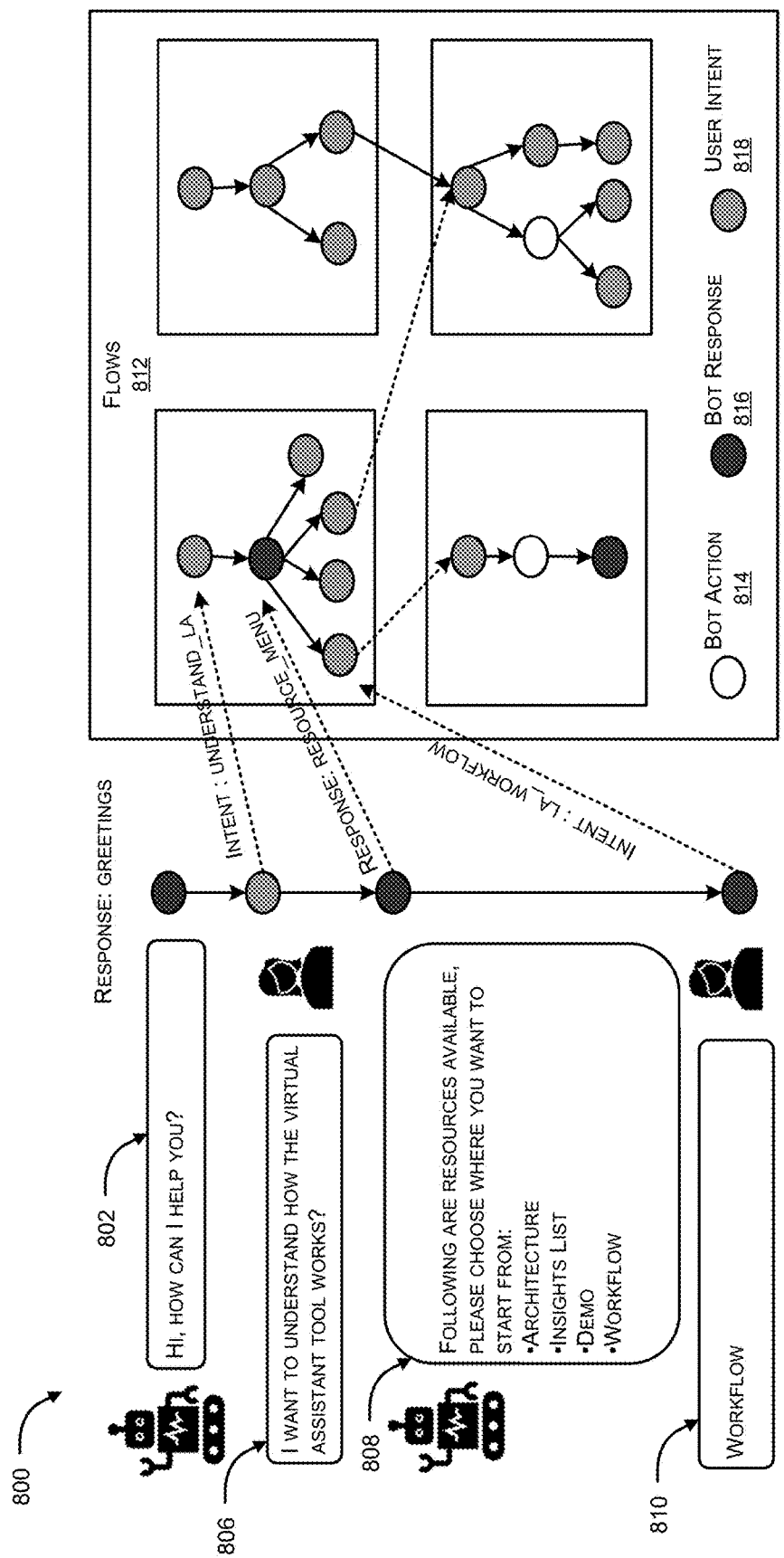
FIG. 8 illustrates an overview of an overlay of an exemplary log on flow datasets, according to an example embodiment of the present disclosure.

In an example embodiment and in reference to FIG. 2, deviation identifier (106) may receive, the chat logs (158) and flow dataset (160) from database (as explained in FIG. 2). The flow dataset (160) may include a pre stored flow dialog network. The deviation identifier (106) may overlay corresponding intent in the chat logs with the prestored flow dialog network to evaluate at least one identifier and a corresponding metadata. The overlay may designate an extent of deviation with respect to flow prediction performance by the executable chatbot. FIG. 8 illustrates an overview (800) of overlay of an exemplary log on flow datasets (812), according to an example embodiment of the present disclosure. As shown, the overview shows initiation of a conversation dialog between a user and an executable chatbot. At 802, initiation of the conversation dialog may correspond to causal greetings. At 806, the user may ask a question "I want to understand how the virtual assistant tool works?". The deviation identifier may be able to overlay the chat log to the existing flow dataset (812) as shown in FIG. 8. The flow datasets (812) may include a pre stored flow dialog network including a set of connected nodes that may correspond to at least one of a user intent (818), a bot response (816) and a bot action (814). For the user utterance at 806, the deviation identifier may identify the intent corresponding to the utterance as "understand_LA". The overlay may lead to an identifier that includes mapping to the pre stored flow dialog network to derive the identifier as "resource_menu". The identifier may correspond to a meta data including multiple alternatives for the user utterance as shown in 806. Upon selection of a specific alternative (for example, workflow) by the user at 810, the corresponding intent (LA workflow) may be identified. Based on the selected alternative by the user at 810, the deviation identifier may be able to proceed further based on the mapping with the respective pre stored flow dialog network. The selected pre stored flow dialog network may include a series of bit actions and responses based on the subsequent user responses. Thus, the overlay may map the utterances (of user) with existing pre-stored flow dialog network in flow datasets to obtain the identifier and metadata such that the bot responses are enabled based on the preset nodes in the pre-stored flow dialog network.

In an example embodiment, deviation identifier may identity or evaluate a performance metric of the system to evaluate bot performance. The performance metric may include a parameter selected from at least one of a user retention, an overall feedback of the user, incomprehension, escalation, abandonment, a containment rate, a frequent conversation path, a time range comparison, loops, exceptions and advisor escalations. The performance metrics may indicate an extent of deviation in bot responses/actions and the aspects that may need to be addressed. FIG. 9 illustrates an overview (900) of performance metrics showing associated parameters (902) and their respective description (904), according to an example embodiment of the present disclosure. As shown, the parameter may include user acquisition or retention that may indicate a number and a distribution of unique, new and returning users observed within filter criteria. This may enable to assess the performance of the executable chatbot in view of regular usage by the same users, which indicates that the executable chatbot is performing well. The parameter may also include sessions and journeys that may represent a number and a distribution of sessions and types of journeys observed within filter criteria. The parameter may also include assessing most frequent journeys observed within the filter criteria to evaluate the most common accessed conversation or flows. The parameter may also include overall feedback including number of individual feedbacks observed & weighted average of all feedbacks received to check the performance of the chatbot. The parameter may include assessment of incomprehension, wherein a number and distribution of sessions may be assessed where the chatbot may not have understood the user utterance. The deviation identifier may also assess escalation events that may indicate number and distribution of sessions where either chatbot handed over to a live agent or user explicitly asked to be handed over to a live agent.

The parameter may also include abandonment indicating number and distribution of sessions where the conversation did not reach expected end of flow. This may assist to evaluate behavioral deviation of the chatbot. The parameter may also include considering containment rate that includes number and distribution of containments and interactions which did not result in failures such as incomprehension, escalation or abandonment as described hereinabove. It may be necessary to increase the containment rate to improve end-user experience and engagement with the chatbot and to improve relevance of menu options by identifying which topics to display at multiple levels. The deviation identifier may also consider understanding frequent conversation paths to evaluate most frequent intent sequences followed by users in overall and in case of failures. The parameter may also enable to evaluate time range comparison to assess comparison and calculation of improvement or decline with respect to equivalent preceding duration.

Figure 10:
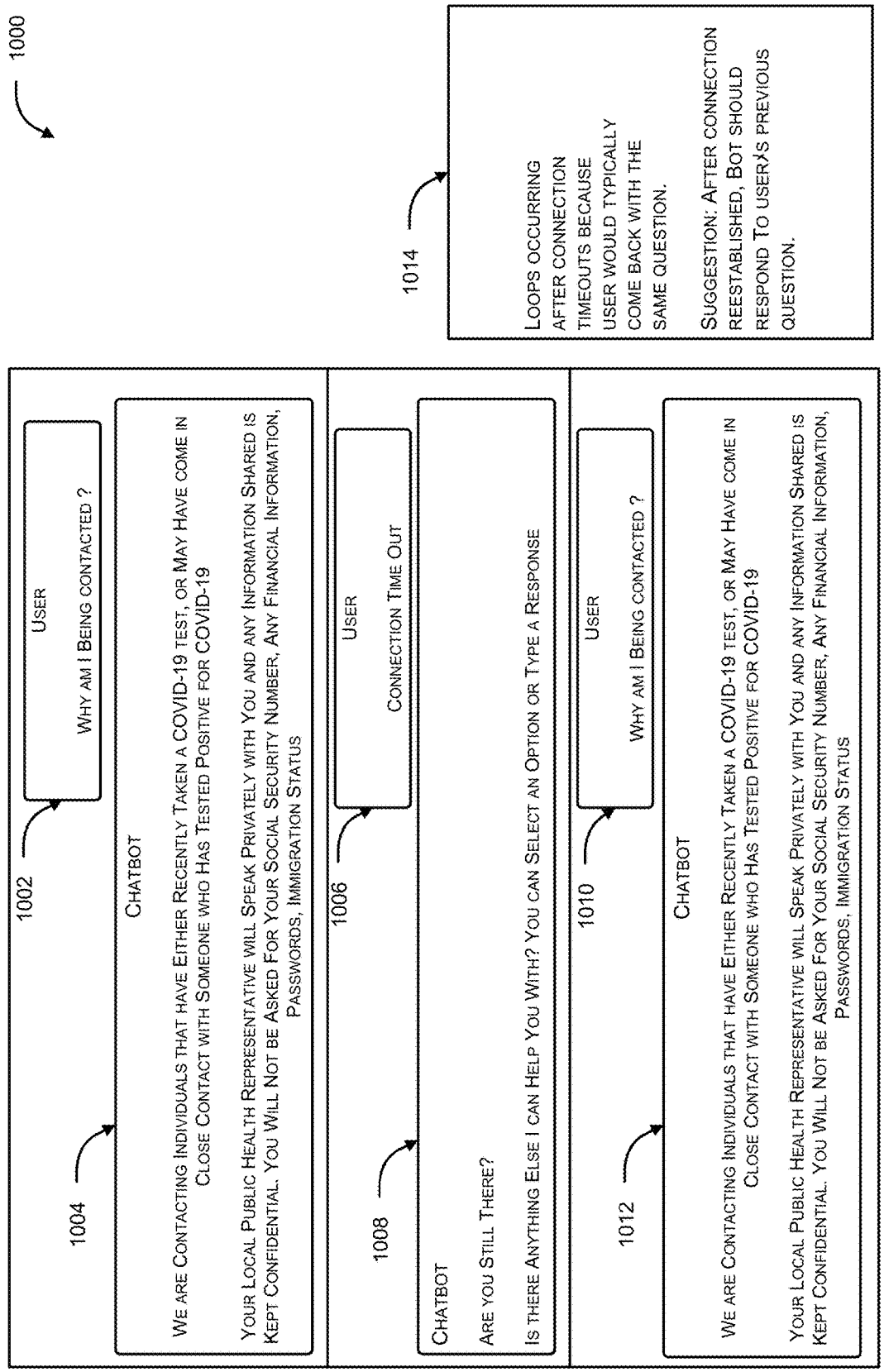
FIG. 10 illustrates an overview of an example conversation dialog displaying occurrence of loops, according to an example embodiment of the present disclosure.

Another important parameter that may be observed includes loops that indicate number of sessions that follow the same flow path multiple times in a single session. FIG. 10 illustrates an overview (1000) of an example conversation dialog displaying occurrence of loops, according to an example embodiment of the present disclosure. As shown in FIG. 10, a user initiates a conversation at 1002 to which executable chatbot responds at 1004. However, after a connection time out at 1006, when the chatbot verifies need for further assistance at 1008. In this case, after connection timeout, there is a possibility that user would typically come back with the same question as observed in 1010, to which the chatbot may respond with the same answer at 1012, thus giving rise to loops. The chatbot may be upgraded to ensure that after connection is re-established, the chatbot may present a response to user's previous question to avoid loops (1014). In reference to FIG. 9, other parameters may include exceptions that indicate a number of sessions where an unexpected bot response (program error, metadata mismatch) may be observed. This may be very crucial in identifying the deviation in bot behavior for effective upgrading and performance. Other parameters may include advisor escalations including a number and distribution of escalation, handling successful resolutions, responses indicating agent busy and/or out of office and other such responses. The mentioned parameters including other such parameters may assist in accurate identification of bot behavior to reduced manual efforts in analyzing chat logs and deducing insights, so that the process is automated and thee chatbot is regularly upgraded for efficient performance.

Figure 11:
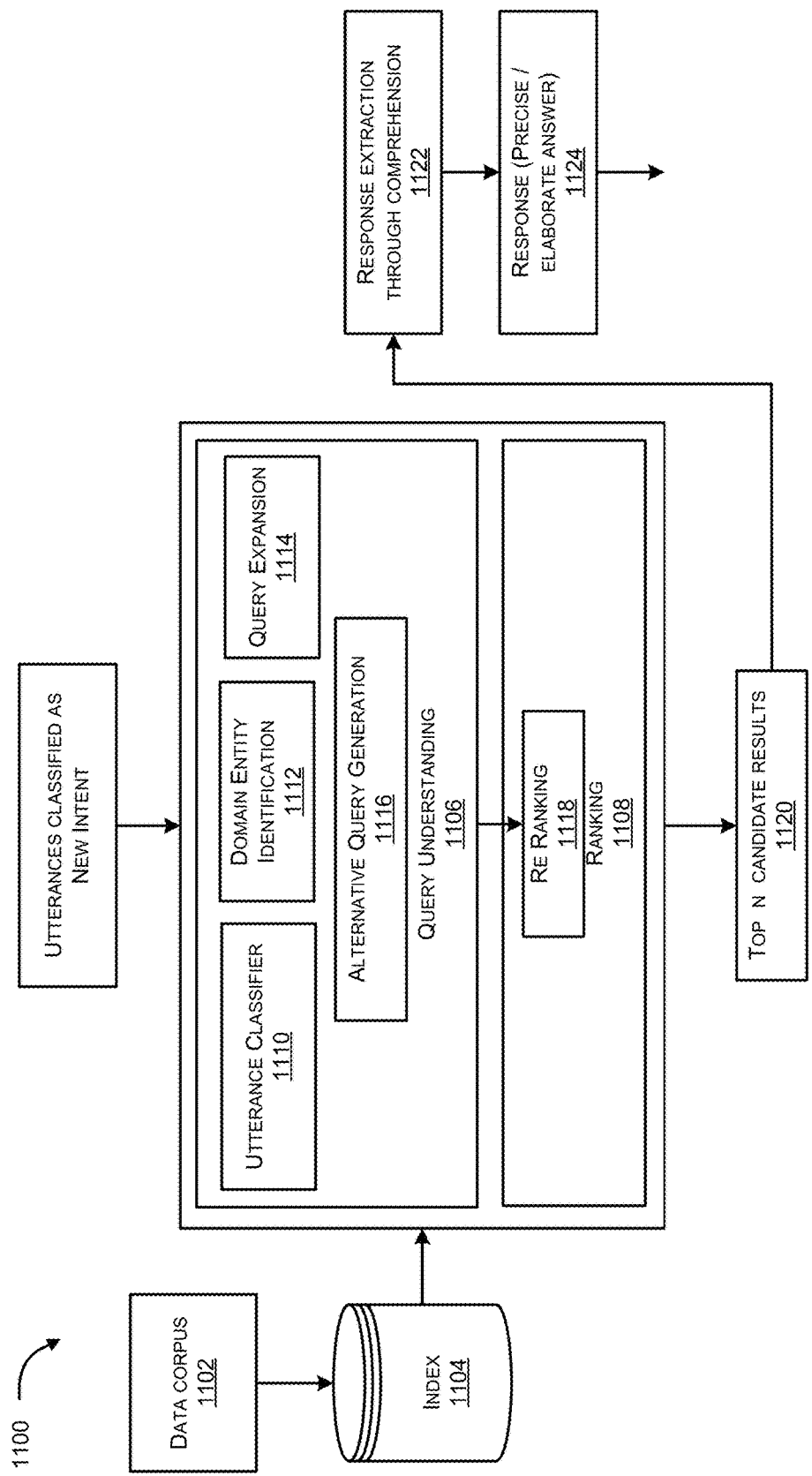
FIG. 11 illustrates an overview for generation of automated responses to new intent based utterances by response identifier of FIG. 1, according to an example embodiment of the present disclosure.

The response identifier (108) of the present disclosure may generate new responses for utterances classified as new intent based utterances by the fallout utterance analyzer (104). In an example embodiment, chat logs may also include conversation records for interactions that may not contained by the chatbot but may be between a user and a human agent. The response identifier (108) may search the chat logs for finding responses to the new intent based utterances. If a response is found that may be relevant for the new intent based utterances then the response may be composed from such conversation records. In one example embodiment, the composed response may be sent to self-learning engine for verification and updating. In another example embodiment, the composed response may be verified manually. In yet another example embodiment, a semantic analysis may be performed on data corpus from the database to extract possible responses to the new intent based utterances. FIG. 11 illustrates an overview (1100) for generation of automated responses to new intent based utterances by response identifier (108) of FIG. 1, according to an example embodiment of the present disclosure. The response identifier (108) may receive, new intent based utterances from the fallout utterance analyzer (104 of FIG. 1). The new intent based utterances may correspond to the newly identified intent. The response identifier (108) may index the document corpus (1102) from the database based on the new intent based utterances to obtain a plurality of queries (as shown in 1104). The response identifier (108) may evaluate each query to perform a query understanding (1106) and query ranking (1118) to obtain endorsed queries or top "N" candidate results (1120). The endorsed queries may be used to generate auto-generated responses corresponding to the new intents for upgrading the executable chatbot. In an example embodiment, the response identifier (108) may evaluate each query by at least one of an utterance classification (1110), a domain entity classification (1112), a query expansion (1114), an alternative query generation (1116). The utterance classification may classify the query based on an answer type using a set of predefined classifiers. The classifiers may classify the query based on the classes that may correspond to expected answer type. In an example embodiment, the classes may be at least one of ABBR (pertaining to abbreviations), DESC (pertaining to descriptions), NUMBER, LOCATION, ENTITY, HUMAN and other such classes. In an example embodiment, the classifiers may be built using a publicly available dataset or document corpus. The domain entity classification may be performed by entity based annotations to tag annotations to the queries based on entity of a domain. In an example embodiment, the domain entity classification may include table-look ups, simple noun (NN) phrases and other such methods. The query expansion (1114) may be done to expand the query to enhance the context or meaning. In an example embodiment, the query expansion (1114) may be performed using synonyms, domain dictionaries and other pre-stored datasets. In another embodiment, if no relevant queries may be obtained for the expanded queries, the alternative query generation (1116) may be performed to generate alternate queries using chat logs. The alternative query generation (1116) may be performed by identifying query in historical chat logs including same/similar nouns as in the given query. In another example embodiment, the alternative query generation (1116) may also be performed by identifying query in the chat logs, which may have the least semantic similarity with the given query.

The plurality of queries may be ranked (1108) and/or re-ranked (1118) based on the relevance of the plurality of queries to the new intent based utterance to obtain the endorsed queries (1120). In an embodiment, the re-ranking of the plurality of queries (indexed results at 1104) may be done using output from the utterance classifier 1110 and the domain entity identification 1112. The re-ranking may be done to improve the accuracy of the bot response. In an embodiment, re-ranking may be performed based on answer type (extent of similarity) and number of entities (highest occurrence of entity name) present in the passage. In an example embodiment, the similarity may be evaluated using a Part-Of-Speech Tagger (POS Tagger). The POS tagger may read text in the passage and assign parts of speech to each term, word, token in the passage. For example, if "A" may be answer type predicted for a given query based on passages "$p_1, p_2, \ldots, p_n$", the passages may be passed through the POS tagger to identify tags of each term or token in the paragraphs. If $a_i = k(p_i)$ be the number of tokens that $p_i$ ($p_i$=any of $p_1, p_2, \ldots, p_n$) has the same tag as A, then passages may be ranked using $a_i$.

In an example embodiment, response identifier (108) may evaluate at least one passage corresponding to each endorsed query. Each passage may include an answer to the endorsed query (1120) and entity name. The response identifier (108) may extract (1112) a suitable response to the new intent based utterance from the passages through comprehension. In an example embodiment, a precise or an elaborate response answer (1124) may be extracted from a passage if the passage has a proximate answer to the query and a highest occurrence of the entity name. In an example embodiment, the response may be extracted from the passage using techniques including, for example, Bi-Directional Attention Flow for Machine Comprehension (BiDAF), Embeddings from Language Models (ELMO), or models that use combination of BiDAF and ELMO.

FIG. 12 illustrates an overview (1200) of an example passage (1202) (pertaining to query) for generating an auto-generated response by response identifier (108) of FIG. 1, according to an example embodiment of the present disclosure. The passage 1202 may pertain to an endorsed query obtained by the response identifier for the new intent based utterances (1204). As observed in FIG. 12, the auto-generated responses (1206) by the response identifier (108) for each of the utterances (1204) may include the answers that may have been extracted from the passage 1202. It may be observed that the auto-generated responses are relevant to the new intent based utterances (1204), thereby displaying the effectiveness of the response identifier (108) in generating meaningful auto-generated responses.

Figure 13:
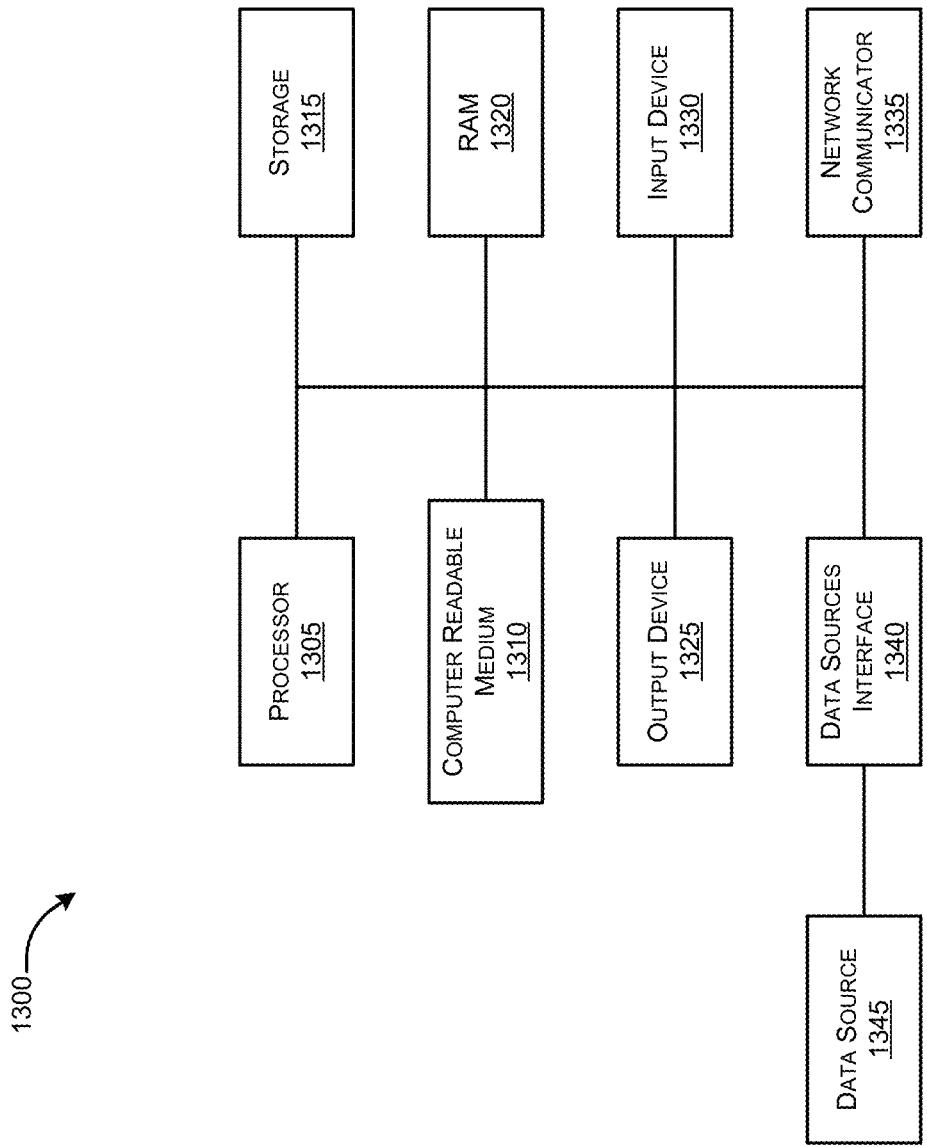
FIG. 13 illustrates a hardware platform for implementation of the disclosed system, according to an example embodiment of the present disclosure.

FIG. 13 illustrates a hardware platform (1300) for implementation of the disclosed system, according to an example embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 1300. As illustrated, the hardware platform 1300 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 1300 may be a computer system such as the system 100 that may be used with the embodiments described herein. The computer system may represent a computational platform that includes components that may be in a server or another computer system. The computer system may execute, by the processor 1305 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 1305 that executes software instructions or code stored on a non-transitory computer-readable storage medium 1310 to perform methods of the present disclosure. The software code includes, for example, instructions to gather data and documents and analyze documents. In an example, the fallout utterance analyzer 102, the response identifier 108, the deviation identifier 106, and the flow generator and enhancer 110 may be software codes or components performing these steps.

The instructions on the computer-readable storage medium 1310 are read and stored the instructions in storage 1315 or in random access memory (RAM). The storage 1315 may provide a space for keeping static data where at least some instructions could be stored for later execution. The stored instructions may be further compiled to generate other representations of the instructions and dynamically stored in the RAM such as RAM 1320. The processor 1305 may read instructions from the RAM 1320 and perform actions as instructed.

The computer system may further include the output device 1325 to provide at least some of the results of the execution as output including, but not limited to, visual information to users, such as external agents. The output device 1325 may include a display on computing devices and virtual reality glasses. For example, the display may be a mobile phone screen or a laptop screen. GUIs and/or text may be presented as an output on the display screen. The computer system may further include an input device 1330 to provide a user or another device with mechanisms for entering data and/or otherwise interact with the computer system. The input device 1330 may include, for example, a keyboard, a keypad, a mouse, or a touchscreen. Each of these output device 1325 and input device 1330 may be joined by one or more additional peripherals. For example, the output device 1325 may be used to display the results such as bot responses by the executable chatbot.

A network communicator 1335 may be provided to connect the computer system to a network and in turn to other devices connected to the network including other clients, servers, data stores, and interfaces, for instance. A network communicator 1335 may include, for example, a network adapter such as a LAN adapter or a wireless adapter. The computer system may include a data sources interface 1340 to access the data source 1345. The data source 1345 may be an information resource. As an example, a database of exceptions and rules may be provided as the data source 1345. Moreover, knowledge repositories and curated data may be other examples of the data source 1345.

Figure 14:
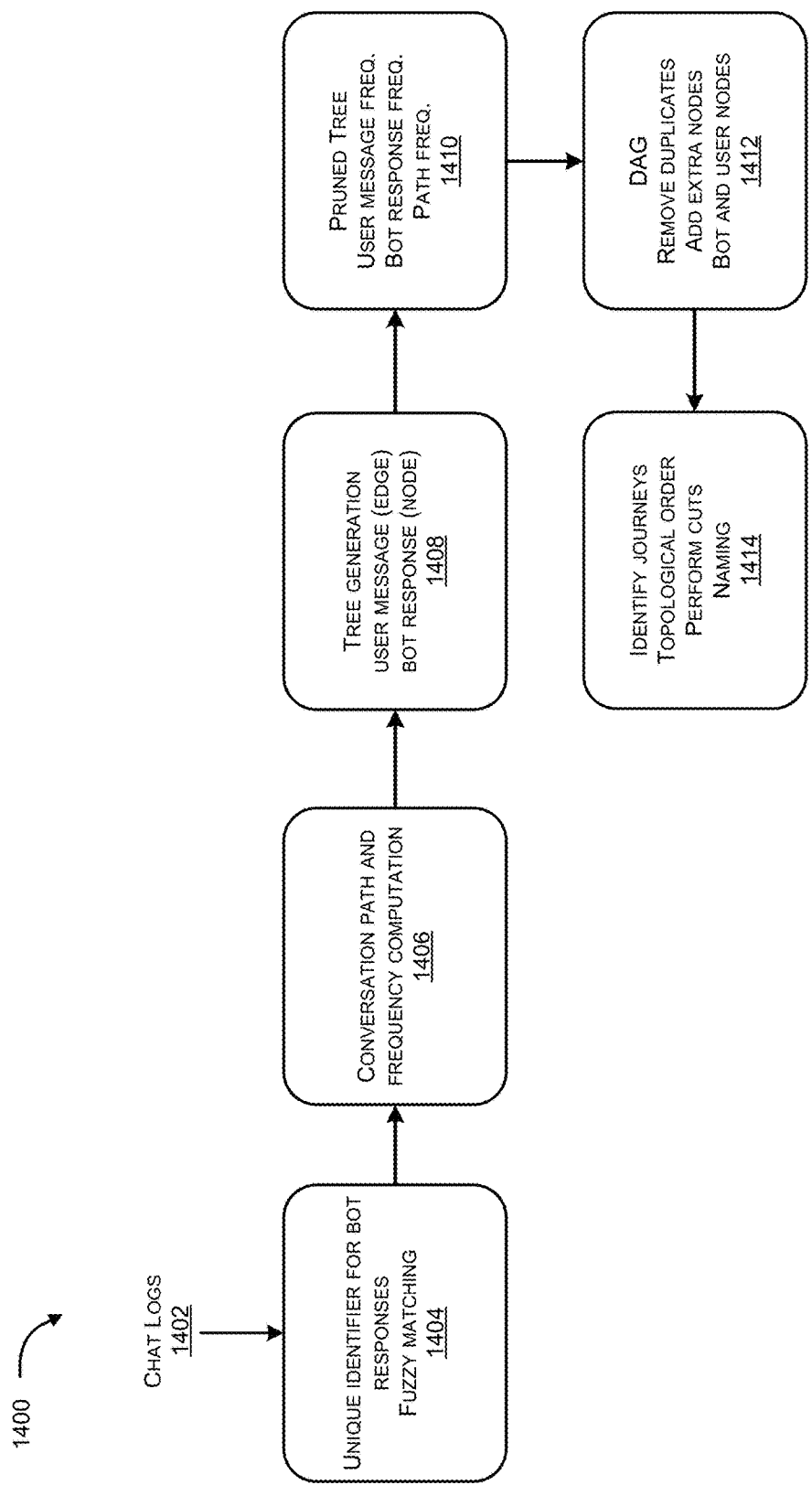
FIG. 14 illustrates a flow diagram for generation of auto-generated conversational dialog flow by flow generator and enhancer 110 of FIG. 1, according to an example embodiment of the present disclosure.

In an example embodiment, the flow generator and enhancer 110 may generate an auto-generated conversational dialog flow for upgrading the executable chatbot. The objective of the flow generator and enhancer 110 may pertain to generating flows in cases where only conversational logs may not be available. The objective of the flow generator and enhancer 110 may also be related to comparing flows generated from the chat logs and newly generated flows that may help in verifying the flow configurations and working performance of the chatbots. FIG. 14 illustrates a flow diagram (1400) for generation of auto-generated conversational dialog flow by flow generator and enhancer 110 of FIG. 1, according to an example embodiment of the present disclosure. In an example embodiment, the flow generator and enhancer 110 may receive chat logs (1402) from the database, wherein using the chat logs (1402), the flow generator and enhancer may generate a unique identifier for bot responses based on fuzzy matching (1404). The unique identifier may be in form of response identity (ID), wherein the fuzzy matching may generate the unique identifier for bot responses by finding pairwise fuzzy matches based on a threshold. For example, a threshold of 0.95 may be taken as the threshold to mark two or more responses with same identifiers or same ID. The flow generator and enhancer 110 may also compute a conversation path and frequency (1406) to evaluate user utterances and their corresponding frequency. Based on the previous steps, the flow generator and enhancer 110 may generate a first dialog tree (1408) by using a prestored library in the database. In an example embodiment, the prestored library may be Treelib Python library. The first dialog tree may include nodes and edges with multiple links. The links may correspond to linkages between bot responses in a session. In an example embodiment, for generating the first dialog tree, the flow generator and enhancer 110 may loop through all the sessions in the chat log, wherein a new node is added as bot response ID and a new link is added between bot responses which occur consequently in a log session, if a link may not exist with the same user conversation. The flow generator and enhancer 110 may parse all the chat logs and generate a tree with the nodes and edges, wherein the nodes may correspond to the identifier and the edge may include information pertaining to the user utterances and their corresponding frequency. The flow generator and enhancer 110 may prune the first dialog tree to obtain a first pruned dialog tree (1410). The first dialog tree may be pruned to remove all links with lower frequencies (or beyond a threshold), to retain only the links where the system is highly confident. Thus, the first pruned dialog tree may include a set of links from the multiple links with a frequency value beyond a predetermined threshold. In an example embodiment, the threshold may be empirically set as frequencies lower than 5% of mean of frequencies. The flow generator and enhancer 110 may process the first pruned dialog tree to remove all duplicates and extra nodes at 1412.

The first pruned dialog tree is converted into a Directed Acyclic Graph (DAG) by parsing through all nodes. In an example embodiment, a python network library may be used with DAG. This may include at least one of adding "from" nodes with response ID (attribute as type of bot), adding "to" nodes with response ID (attribute as type of bot), adding user utterances on the links from nodes, adding links from node to user utterances node (attribute as type of user) and adding links from user utterances node to other nodes (Attribute as type of user). After adding each link, the DAG may be checked if any cycle is getting formed. In an example embodiment, the depth-first reversal may be used for checking formation of the cycle such that if the cycle may be detected then the corresponding link may be deleted. After the DAG is formed, all user utterances node are looped such that if the degree of user utterances node >1, extra nodes may be added between user utterances node and "to" bot nodes, wherein the node attribute may correspond to type condition. The flow generator and enhancer 110 may identify the topological journeys to gather more insights on the various use cases. The topological sorting may be performed over the DAG using network functions such that cuts may be performed over the topologically sorted network. The topologically sorted nodes may be looped through, wherein the system may initiate all the nodes with no incoming edges as root for use cases. i.e., with number of in_degree=0. If a node has a single parent, the nodes may be added to the use cases with parent node. If more than 1 parent nodes may be present, the nodes may be added to the parent nodes and the parent nodes may be added as root. For the various use cases, names may be provided based on the first bot response and user utterances.

In an example embodiment, the flow generator and enhancer 110 may learn the sequence of questions popularly asked by users over time and may gradually suggest users with the learned question paths as choices/menu. This may facilitate the users by providing more relevant interesting paths or navigation through buttons, thereby enriching the user experience and the performance of the chatbot. This may also assist in managing periodic updates based on latest path selection trends by users, context-aware solution and also may be personalized based on user attributes such as generating navigational buttons geo-wise.

Figure 15:
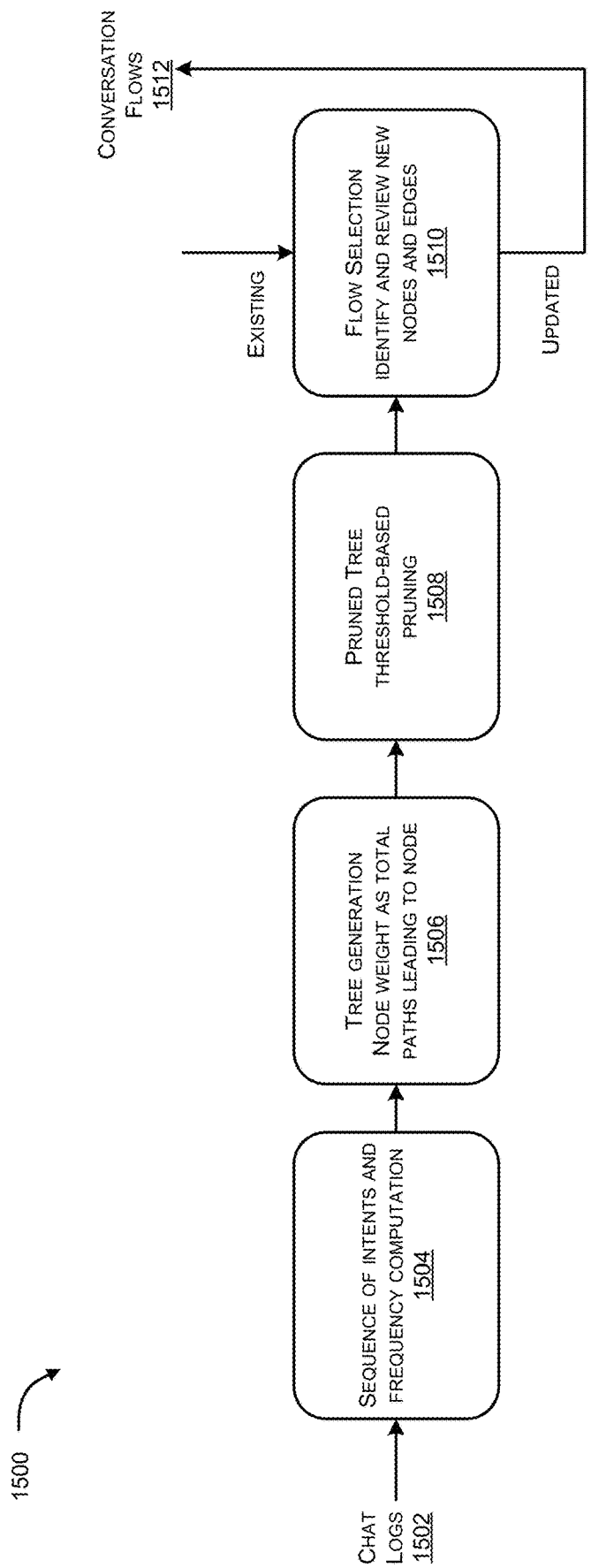
FIG. 15 illustrates a flow diagram for finding missing conversation dialog flow using frequent path analysis, according to an example embodiment of the present disclosure.

In an embodiment, the flow generator and enhancer enhances a flow of a generated tree corresponding to the flow dataset in the database. In an example embodiment, a missing conversation dialog flow pertaining to the generated tree can be identified by using the flow generator and enhancer. FIG. 15 illustrates an flow diagram (1500) for finding missing conversation dialog flow using frequent path analysis, according to an example embodiment of the present disclosure. In an example embodiment, the missing conversation dialog flow may be identified by the flow generator and enhancer 110 by using chat logs 1502. At 1506, the missing conversation dialog flow may be identified by generating a second dialog tree comprising a set of second nodes with a node weight. In an example embodiment, in a conversation (series of exchanges between user and conversation), each conversation may be represented as a path with nodes such that each node may be identified as intent name (utterance) and an exchange number. These paths may be generated over the chat logs and merged, wherein the node weight in the merged tree is computed as the number of paths that lead to that node. At 1504, the second dialog tree may be generated based on a sequence of the plurality of intents and computation of corresponding occurrence frequency. At 1508, the second dialog tree may be pruned by eliminating branches having the node weight below a predefined threshold weight to obtain a second pruned dialog tree 1508. At 1510, a set of new conversation dialog flows in the second pruned dialog tree may be compared with existing conversation dialog flows in flow datasets (pre stored dialog flow) to identity new nodes and edges for generating the conversation flows (1512) for missing links that may be updated in flow datasets.

Figure 16A:
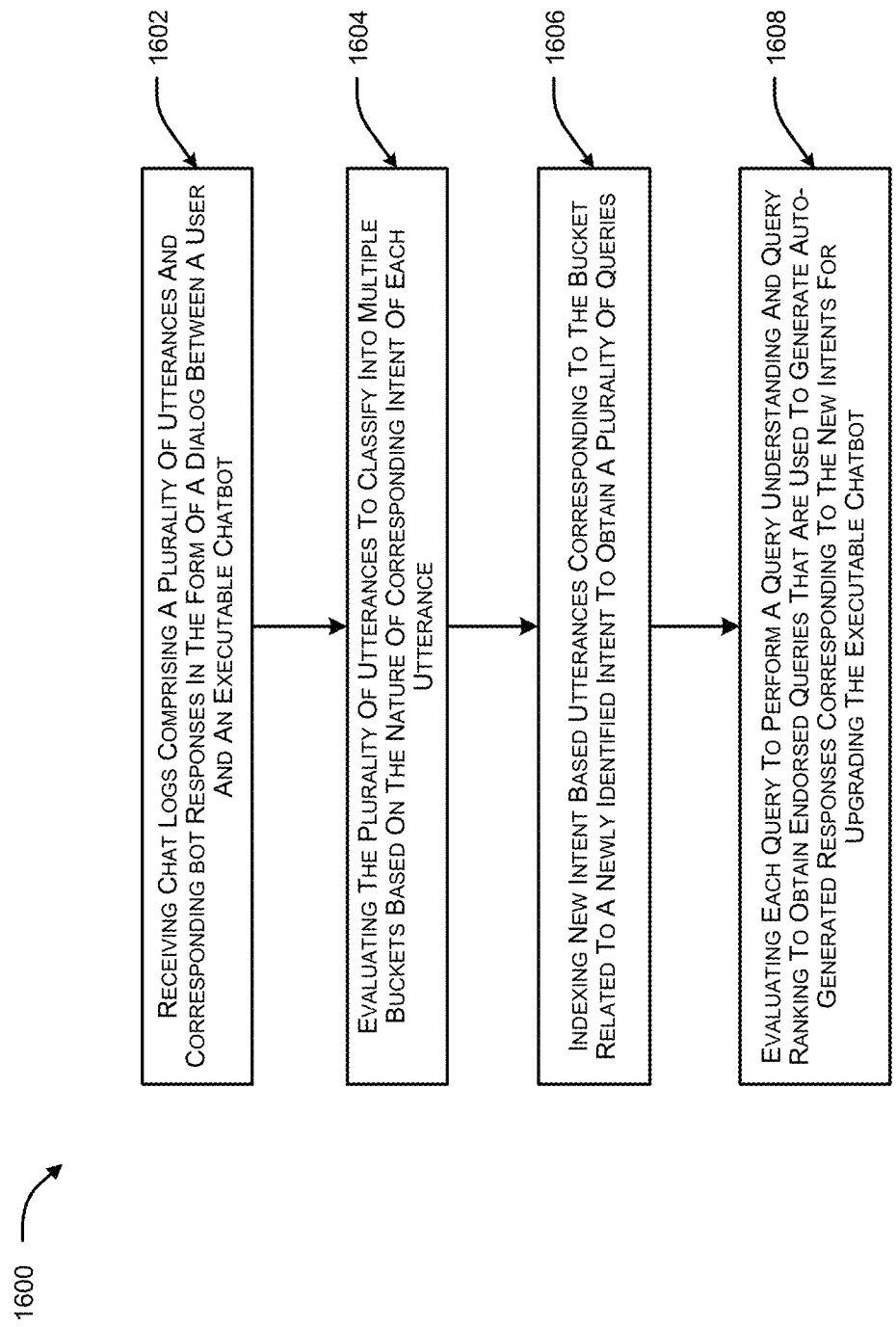

FIG. 16A illustrates a flow diagram 1600 for upgrading an executable chatbot based on intent, according to an example embodiment of the present disclosure. At 1602, the method includes a step of receiving, by a processor, chat logs that may include a plurality of utterances pertaining to a user and corresponding bot responses by an executable bot. The chat logs may be in the form of a dialog between the user and the executable chatbot. At 1604, the method includes a step of evaluating, by a processor, the plurality of utterances to classify into multiple buckets based on the nature of corresponding intent of each utterance. The multiple buckets may pertain to at least one of an out-of-scope intent, a newly identified intent and a new variation of an existing intent. At 1606, the method may include a step of indexing the document corpus from the database to obtain a plurality of queries. The indexing may be performed based on the new intent based utterances corresponding to the bucket related to the newly identified intent. At 1608, the method may include a step of evaluating, by a processor, each query to perform a query understanding and query ranking to obtain endorsed queries. The endorsed queries may be used to generate auto-generated responses corresponding to the new intents for upgrading the executable chatbot.

FIG. 16B illustrates a flow diagram 1650 for upgrading an executable chatbot based on flows, according to an example embodiment of the present disclosure. At 1652, the method may include a step of receiving, by the processor, chat logs and a flow dataset. The flow dataset include a prestored flow dialog network. At 1654, the method may include a step of overlaying, by the processor, the corresponding intent in the chat logs with the prestored flow dialog network to evaluate at least one identifier and a corresponding metadata. The overlay may indicate an extent of deviation with respect to flow prediction performance by the executable chatbot. At 1656, the method may include a step of generating, by the processor, a first dialog tree including nodes and edges with multiple links. The node may correspond to the identifier and the edge may include an information pertaining to the plurality of utterances and their corresponding frequency. At 1656, the method may include a step of pruning, by the processor, the first dialog tree to obtain a first pruned dialog tree including a set of links from the multiple links with a frequency value beyond a predetermined threshold. At 1658, the method may include a step of processing, by the processor, the first pruned dialog tree to generate an auto-generated conversational dialog flow for upgrading the executable chatbot. In an example embodiment, the method may include a step of enhancing a flow of a generated tree corresponding to the flow dataset in the database. In an example embodiment, the step of enhancing the flow of the generated tree may be done by identifying a missing conversation dialog flow pertaining to the generated tree. In an example embodiment, the step of enhancing the flow (identifying the missing conversation) may include a sub-step of receiving the generated tree from the database. The step of enhancing may include generating, by the processor, a second dialog tree including a set of second nodes with a node weight. The second dialog tree may be generated based on a sequence of the plurality of intents and computation of corresponding occurrence frequency. The step of enhancing may include may include pruning, by the processor, the second dialog tree by eliminating branches having the node weight below a predefined threshold weight to obtain a second pruned dialog tree. The step of enhancing may include comparing, by the processor, a set of new conversation dialog flows in the second pruned dialog tree with pre stored dialog flow to and edges for identifying the missing conversational upgrading the executable chatbot.

The order in which the methods 1600 and 1650 are described is not intended to be construed as a limitation, and any number of the described method blocks may be combined or otherwise performed in any order to implement the methods 1600 and 1650, or an alternate method. Additionally, individual blocks may be deleted from the methods 1600 and 1650 without departing from the spirit and scope of the present disclosure described herein. Furthermore, the methods 1600 and 1650 may be implemented in any suitable hardware, software, firmware, or a combination thereof, that exists in the related art or that is later developed. The methods 1600 and 1650 describe, without limitation, the implementation of the system 100. A person of skill in the art will understand that methods 1600 and 1650 may be modified appropriately for implementation in various manners without departing from the scope and spirit of the disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a processor comprising:
   a fallout utterance analyzer to:
      receive, from a database, chat logs comprising a plurality of utterances pertaining to a user and corresponding bot responses by an executable chatbot, wherein the chat logs are in the form of a dialog between the user and the executable chatbot; and
      evaluate, by comparison with a document corpus from the database, the plurality of utterances to classify into multiple buckets based on the nature of corresponding intent of each utterance, wherein the multiple buckets pertain to at least one of an out-of-scope intent, a newly identified intent, and a new variation of an existing intent;
   a response identifier to:
      receive, from the fallout utterance analyzer, new intent-based utterances corresponding to the bucket related to the newly identified intent;
      index, based on the new intent-based utterances, the document corpus from the database to obtain a plurality of queries;
      evaluate each query to perform a query understanding and query ranking to obtain endorsed queries, wherein the endorsed queries are used to generate auto-generated responses corresponding to the new intents for upgrading the executable chatbot;
   a flow generator and enhancer to:
      update a flow of a generated tree corresponding to a flow dataset in a database, wherein a missing conversation dialog flow pertaining to the generated tree is identified by a flow generator and enhancer by generating a second dialog tree comprising a set of second nodes with a node weight, wherein the second dialog tree is generated based on a sequence of a plurality of intents and computation of corresponding occurrence frequency,
      wherein the second dialog tree is pruned by eliminating branches having the node weight below a predefined threshold weight to obtain a second pruned dialog tree, and
      wherein a set of updated conversation dialog flows in the second pruned dialog tree is compared with a pre-stored dialog flow to identity new nodes and edges for upgrading the executable chatbot; and
   a self-learning engine to:
      update at least one of the auto-generated responses corresponding to the new intents, and an auto-generated conversational dialog flow, for upgrading the executable chatbot;
      determine an accuracy of at least one of the auto-generated responses and the auto-generated conversational dialog flow, based on a predefined threshold; and
      update, beyond the predefined threshold, at least one of the auto-generated responses and the auto-generated conversational dialog flow, based on determining the accuracy.

2. The system as claimed in claim 1, the processor comprising:
   a deviation identifier to:
      receive, from the database, the chat logs, and a flow dataset, wherein the flow dataset comprises a pre stored flow dialog network;
      overlay the corresponding intent in the chat logs with the prestored flow dialog network to evaluate at least one identifier and a corresponding metadata, wherein the overlay designates an extent of deviation with respect to flow prediction performance by the executable chatbot; and
   a flow generator and enhancer to:
      receive, from the database, the chat logs;
      generate, based on the chat logs, using a prestored library in the database, a first dialog tree comprising nodes and edges with multiple links, wherein the node corresponds to the identifier and the edge comprises information pertaining to the user utterances and their corresponding frequency;
      prune the first dialog tree to obtain a first pruned dialog tree comprising a set of links from the multiple links with a frequency value beyond a predetermined threshold; and
      process the first pruned dialog tree to generate the auto-generated conversational dialog flow for upgrading the executable chatbot.

3. The system as claimed in claim 1,
wherein if the accuracy of the auto-generated responses is equal to or exceeds a first predefined threshold, the auto-generated responses are sent to a training dataset in the document corpus,
wherein if the accuracy of the auto-generated responses is less than the first predefined threshold, the auto-generated responses are sent to a self-learning engine of the system for updating the auto-generated responses, and
wherein if the accuracy of the auto-generated conversational dialog flow is equal to or exceeds a second predefined threshold, the auto-generated conversational dialog flow is sent to the flow dataset in the database; and
wherein if the accuracy of the auto-generated conversational dialog flow is less than the second predefined threshold, the auto-generated conversational dialog flow is sent to the self-learning engine for updating the auto-generated conversational dialog flow.

4. The system as claimed in claim 1, wherein the fallout utterance analyzer classifies the plurality of utterances into the bucket pertaining to the out-of-scope intent by an anomaly detection algorithm including support vector machine (SVM).

5. The system as claimed in claim 1, wherein the fallout utterance analyzer classifies the plurality of utterances into the bucket pertaining to the new variation by at least one of the evaluation of incomprehension of the plurality of utterances by the executable chatbot, probability distribution of the plurality of utterances and threshold based computation of the plurality of utterances.

6. The system as claimed in claim 5, wherein the evaluation of incomprehension identifies that the utterances pertain to the new variation by detecting if subsequent utterances lead to a non-valid response in a single session by the executable bot and if a natural language processing (NLP) module associated with the system is able to predict the same intent.

7. The system as claimed in claim 5, wherein the probability distribution is performed by moment analysis including at least one of computing kurtosis, skewness, entropy and thresholding, wherein if the utterances fall above a third predefined threshold, the corresponding intent is concluded as the new variation of the existing intent, and wherein if the utterances fall below a third predefined threshold, the corresponding intent is concluded as the new intent.

8. The system as claimed in claim 5,
wherein the threshold based computation is performed by computing, using the document corpus, a threshold range bearing a minimum value and a maximum value, wherein a distance between the minimum value and the maximum value is computed using embeddings including at least one of Bidirectional Encoder Representations from Transformers (BERT), and Word Mover's Distance (WMD).

9. The system as claimed in claim 8,
wherein the fallout utterance analyzer identifies a closest training utterance for each fallout utterance of the plurality of utterances such that if the closest training utterance falls within the threshold range, the corresponding intent is concluded as the new variation.

10. The system as claimed in claim 1, wherein the response identifier evaluates each query by at least one of an utterance classification, a domain entity classification, a query expansion, an alternative query generation, wherein the utterance classification classifies the query based on an answer type using a set of predefined classifiers.

11. The system as claimed in claim 10, wherein the domain entity classification performs entity based annotations, and wherein the query expansion is performed based on at least one of synonyms and domain dictionaries.

12. The system as claimed in claim 1, wherein the response identifier evaluates at least one passage pertaining to the endorsed query, wherein each passage comprises an answer to the endorsed query and entity name, wherein a passage is selected for auto-generation of responses if the passage has a proximate answer to the query and a highest occurrence of the entity name.

13. The system as claimed in claim 2, wherein the deviation identifier is to identity or evaluate a performance metric of the system including at least one of a user retention, an overall feedback of the user, incomprehension, escalation, abandonment, a containment rate, a frequent conversation path, a time range comparison, loops, exceptions and advisor escalations.

14. A method for automated learning based upgrade an executable chatbot, the method comprising:
receiving, by a processor, chat logs comprising a plurality of utterances pertaining to a user and corresponding bot responses by an executable bot, wherein the chat logs are in the form of a dialog between the user and the executable chatbot;
evaluating, by a processor, the plurality of utterances to classify into multiple buckets based on the nature of corresponding intent of each utterance, wherein the multiple buckets pertain to at least one of an out-of-scope intent, a newly identified intent, and a new variation of an existing intent;
indexing, based on the new intent based utterances corresponding to the bucket related to the newly identified intent, the document corpus from the database to obtain a plurality of queries;
evaluating, by a processor, each query to perform a query understanding and query ranking to obtain endorsed queries, wherein the endorsed queries are used to generate auto-generated responses corresponding to the new intents for upgrading the executable chatbot;
updating, by the processor, a flow of a generated tree corresponding to a flow dataset in a database by identifying a missing conversation dialog flow pertaining to the generated tree, wherein the flow of the generated tree is updated by:
receiving the generated tree from the database;
generating, by the processor, a second dialog tree comprising a set of second nodes with a node weight, wherein the second dialog tree is generated based on a sequence of the plurality of intents and computation of corresponding occurrence frequency;
pruning, by the processor, the second dialog tree by eliminating branches having the node weight below a predefined threshold weight to obtain a second pruned dialog tree; and
comparing, by the processor, a set of new conversation dialog flows in the second pruned dialog tree with pre stored dialog flow to and edges for identifying the missing conversational upgrading the executable chatbot; and
updating, by the processor, at least one of the auto-generated responses corresponding to the new intents, and an auto-generated conversational dialog flow, for upgrading the executable chatbot;
determining, by the processor, an accuracy of at least one of the auto-generated responses and the auto-generated conversational dialog flow, based on a predefined threshold; and
updating, by the processor, beyond the predefined threshold, at least one of the auto-generated responses and the auto-generated conversational dialog flow, based on determining the accuracy.

15. The method as claimed in claim 14, wherein the method comprises:
receiving, by the processor, the chat logs, and a flow dataset, wherein the flow dataset comprises a prestored flow dialog network;
overlaying, by the processor, the corresponding intent in the chat logs with the prestored flow dialog network to evaluate at least one identifier and a corresponding metadata, wherein the overlay indicates an extent of deviation with respect to flow prediction performance by the executable chatbot;
generating, by the processor, a first dialog tree comprising nodes and edges with multiple links, wherein the node corresponds to the identifier and the edge comprises an information pertaining to the plurality of utterances and their corresponding frequency;
pruning, by the processor, the first dialog tree to obtain a first pruned dialog tree comprising a set of links from the multiple links with a frequency value beyond a predetermined threshold; and
processing, by the processor, the first pruned dialog tree to generate the auto-generated conversational dialog flow for upgrading the executable chatbot.

16. A non-transitory computer readable medium comprising machine executable instructions that are executable by a processor to:
receive chat logs comprising a plurality of utterances pertaining to a user and corresponding chatbot responses by an executable bot, wherein the chat logs are in the form of a dialog between the user and the executable chatbot;
evaluate the plurality of utterances to classify into multiple buckets based on the nature of corresponding intent of each utterance, wherein the multiple buckets pertain to at least one of an out-of-scope intent, a newly identified intent, and a new variation of an existing intent;

index, based on new intent based utterances corresponding to the bucket related to the newly identified intent, the document corpus from the database to obtain a plurality of queries;

evaluate each query to perform a query understanding and query ranking to obtain endorsed queries, wherein the endorsed queries are used to generate auto-generated responses corresponding to the new intents for upgrading the executable chatbot;

update a flow of a generated tree corresponding to a flow dataset in a database by identifying a missing conversation dialog flow pertaining to the generated tree, wherein the flow of the generated tree is updated by:

receiving the generated tree from the database;

generating a second dialog tree comprising a set of second nodes with a node weight, wherein the second dialog tree is generated based on a sequence of the plurality of intents and computation of corresponding occurrence frequency;

pruning the second dialog tree by eliminating branches having the node weight below a predefined threshold weight to obtain a second pruned dialog tree;

comparing a set of new conversation dialog flows in the second pruned dialog tree with pre stored dialog flow to and edges for identifying the missing conversational upgrading the executable chatbot;

updating at least one of the auto-generated responses corresponding to the new intents, and an auto-generated conversational dialog flow, for upgrading the executable chatbot;

determining an accuracy of at least one of the auto-generated responses and the auto-generated conversational dialog flow, based on a predefined threshold; and updating beyond the predefined threshold, at least one of the auto-generated responses and the auto-generated conversational dialog flow, based on determining the accuracy.

17. The non-transitory computer readable medium as claimed in claim 16, wherein the readable medium comprises machine executable instructions that are executable by a processor to:

receive the chat logs and a flow dataset, wherein the flow dataset comprises prestored flow dialog network;

overlay the corresponding intent in the chat logs with the prestored flow dialog network to evaluate at least one identifier and a corresponding metadata, wherein the overlay indicates an extent of deviation with respect to flow prediction performance by the executable chatbot;

generate a first dialog tree comprising nodes and edges with multiple links, wherein the node corresponds to the identifier and the edge comprises an information pertaining to the plurality of utterances and their corresponding frequency;

prune the first dialog tree to obtain a first pruned dialog tree comprising a set of links from the multiple links with a frequency value beyond a predetermined threshold; and process the first pruned dialog tree to generate the auto-generated conversational dialog flow for upgrading the executable chatbot.

* * * * *